(12) United States Patent
Ichihara et al.

(10) Patent No.: US 10,216,313 B2
(45) Date of Patent: Feb. 26, 2019

(54) ELECTRONIC APPARATUS AND CONTROL METHOD OF THE SAME

(71) Applicant: CANON KABUSHIKI KAISHA, Tokyo (JP)

(72) Inventors: Atsushi Ichihara, Yokohama (JP); Toshiaki Ueguri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 15/013,944

(22) Filed: Feb. 2, 2016

(65) Prior Publication Data
US 2016/0224179 A1    Aug. 4, 2016

(30) Foreign Application Priority Data
Feb. 4, 2015    (JP) ................................. 2015-020640

(51) Int. Cl.
| | |
|---|---|
| G09G 5/00 | (2006.01) |
| G06F 3/041 | (2006.01) |
| H04N 5/232 | (2006.01) |
| G06F 3/0482 | (2013.01) |
| G06F 3/044 | (2006.01) |
| G06F 3/0488 | (2013.01) |
| G06F 3/0484 | (2013.01) |

(52) U.S. Cl.
CPC ............ *G06F 3/0416* (2013.01); *G06F 3/044* (2013.01); *G06F 3/0418* (2013.01); *G06F 3/0482* (2013.01); *G06F 3/0488* (2013.01); *G06F 3/04842* (2013.01); *H04N 5/23216* (2013.01)

(58) Field of Classification Search
CPC ... H04N 5/23216; G06F 3/0482; G06F 3/044; G06F 3/041; G06F 3/0416; G06F 3/017; G06F 3/0488; G09G 2340/145; H04L 41/22
USPC .......................................... 345/173; 715/863
See application file for complete search history.

(56) References Cited

U.S. PATENT DOCUMENTS

| | | | |
|---|---|---|---|
| 2012/0299856 A1* | 11/2012 | Hasui ................... | G06F 3/0418 345/173 |
| 2013/0329110 A1 | 12/2013 | Yoshida | |
| 2014/0062913 A1* | 3/2014 | Lin ......................... | G06F 3/044 345/173 |
| 2014/0306912 A1 | 10/2014 | Woolley | |

(Continued)

FOREIGN PATENT DOCUMENTS

| | | |
|---|---|---|
| CN | 102968267 A | 3/2013 |
| CN | 102999266 A | 3/2013 |

(Continued)

*Primary Examiner* — Jennifer T Nguyen
(74) *Attorney, Agent, or Firm* — Canon USA, Inc., IP Division

(57) ABSTRACT

Provided are a touch detector capable of detecting touch, a controller effecting control so that a touch operation is invalidated in a case where the touch area detected by the touch detector is equal to or larger than a threshold value, and so that a touch operation is validated in a case where the touch area detected by the touch detector is smaller than a threshold value, and a setting unit setting the threshold value used by the controller so that the threshold value used in a case of displaying a first screen is smaller than the threshold value used by the controller in a case of displaying a second screen in accordance with an operation relating to a displayed item displayed in the first screen having been performed.

20 Claims, 17 Drawing Sheets

(56) References Cited

U.S. PATENT DOCUMENTS

| 2014/0376017 | A1 | 12/2014 | Miyazaki | |
|---|---|---|---|---|
| 2015/0029139 | A1* | 1/2015 | Oshita | G06F 3/044 |
| | | | | 345/174 |
| 2015/0160765 | A1* | 6/2015 | Satou | G06F 3/04883 |
| | | | | 345/173 |

FOREIGN PATENT DOCUMENTS

| CN | 103270475 | A | 8/2013 |
|---|---|---|---|
| EP | 2816416 | A1 | 12/2014 |
| JP | 2010-044520 | A | 2/2010 |
| JP | 2010-182185 | A | 8/2010 |
| JP | 2011-002891 | A | 1/2011 |
| JP | 2012-113666 | A | 6/2012 |
| JP | 2013-171316 | A | 9/2013 |
| JP | 2014-110044 | A | 6/2014 |
| JP | 2014123327 | A | 7/2014 |
| RU | 2451981 | C2 | 5/2012 |

* cited by examiner

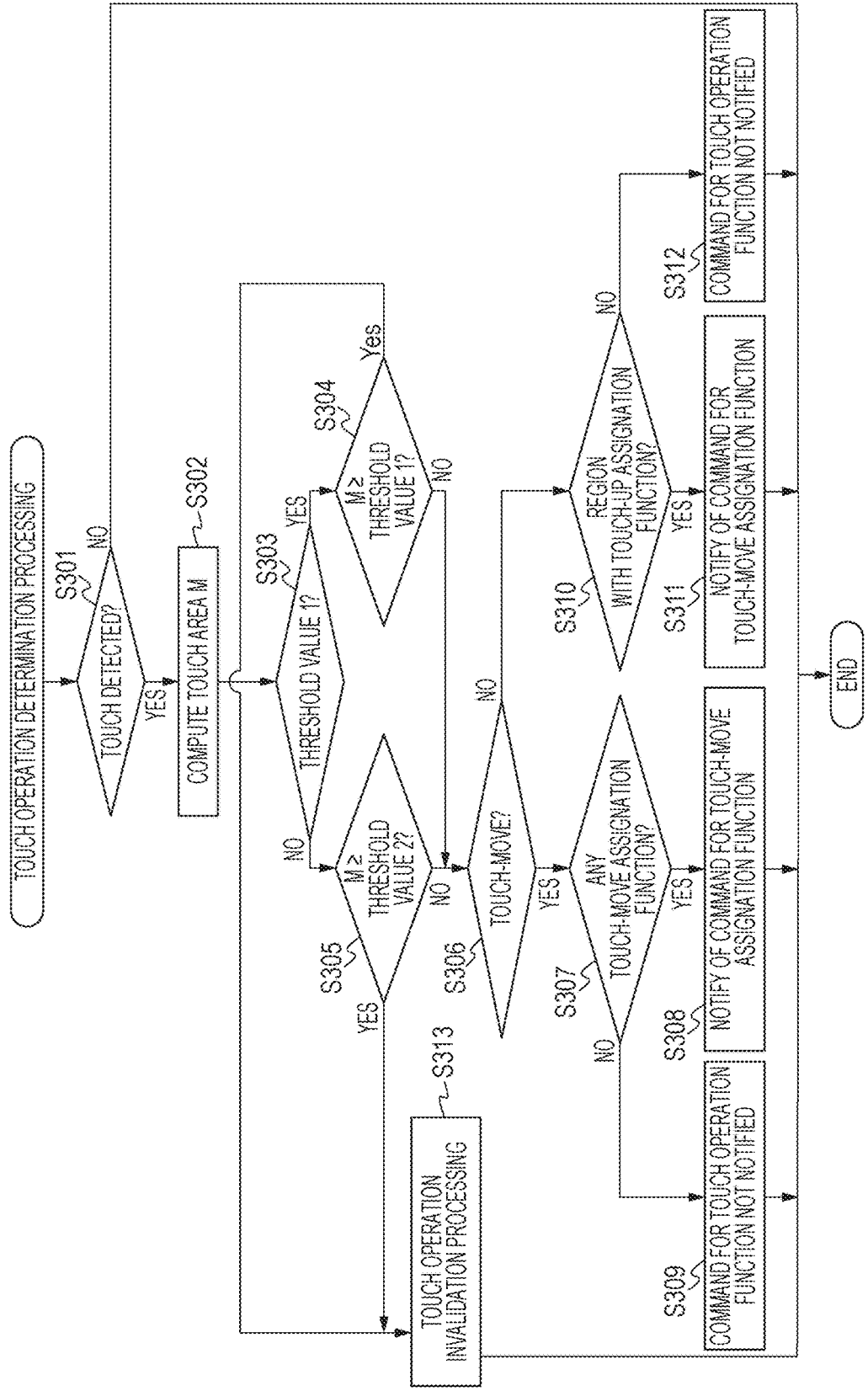

FIG. 12A-1

OLC STYLE SCREEN: THRESHOLD VALUE 1

| COMMAND | OPERATION |
|---|---|
| DISPLAY Q-SETTINGS SCREEN | PRESS Q-SETTINGS BUTTON |

FIG. 12A-2

Q-SETTINGS SCREEN: THRESHOLD VALUE 1

| COMMAND | OPERATION |
|---|---|
| FUNCTION ITEM SELECTION | TOUCH-UP FROM FUNCTION ITEM, PRESS (MOVE) FOUR-WAY OPERATIONAL KEY, AND PRESS SET BUTTON (SELECT) |
| RETURN | TOUCH-UP FROM RETURN BUTTON, PRESS MENU BUTTON |

FIG. 12A-3

FUNCTION ITEM SETTINGS SCREEN: THRESHOLD VALUE 2

| COMMAND | SELECTION FORMAT | OPERATION |
|---|---|---|
| CHANGE SETTINGS OF SELECTED FUNCTION ITEM | SET NUMERICAL VALUE (SHUTTER SPEED SETTING SCREEN, SHARPNESS SETTING SCREEN, ETC.) | TOUCH-MOVE ON SCALE, TOUCH-UP FROM NUMERICAL VALUE CHANGE BUTTON, PRESS (MOVE) FOUR-WAY OPERATIONAL KEY, AND PRESS SET BUTTON (SELECT) |
| | SELECT FUNCTION ITEM (Q-SETTINGS SCREEN, ISO SENSITIVITY SETTINGS SCREEN, PICTURE STYLE SETTINGS SCREEN, ETC.) | TOUCH-UP FROM DISPLAYED FUNCTION ITEM, PRESS (MOVE) FOUR-WAY OPERATIONAL KEY, AND PRESS SET BUTTON (SELECT) |
| RETURN | | TOUCH-UP FROM RETURN BUTTON, PRESS MENU BUTTON |

FIG. 12B-1

PLAYBACK SCREEN: THRESHOLD VALUE 2

| COMMAND | OPERATION |
|---|---|
| FEED IMAGES (FORWARD) | TOUCH-MOVE/FLICK TO LEFT, PRESS RIGHT KEY |
| FEED IMAGES (BACK) | TOUCH-MOVE/FLICK TO RIGHT, PRESS LEFT KEY |
| DISPLAY Q-SETTINGS SCREEN | PRESS Q-SETTINGS BUTTON |

FIG. 12B-2

PLAYBACK Q-SETTINGS SCREEN: THRESHOLD VALUE 1

| COMMAND | OPERATION |
|---|---|
| FUNCTION ITEM SELECTION CHANGE SETTINGS OF SELECTED FUNCTION ITEM | TOUCH-UP FROM FUNCTION ITEM, PRESS (MOVE) FOUR-WAY OPERATIONAL KEY, AND PRESS SET BUTTON (SELECT) |
| RETURN | TOUCH-UP FROM RETURN BUTTON, PRESS MENU BUTTON |

FIG. 12C-1

LIVE VIEW SCREEN: THRESHOLD VALUE 1

| COMMAND | OPERATION |
|---|---|
| DISPLAY Q-SETTINGS SCREEN | TOUCH-UP FROM Q-SETTINGS TOUCH BUTTON, PRESS Q-SETTINGS BUTTON |
| DISPLAY MENU SCREEN | PRESS MENU BUTTON |
| START/END SHOOTING MOVING IMAGES | PRESS LIVE VIEW BUTTON |

FIG. 12C-2

SHOOTING Q-SETTINGS SCREEN: THRESHOLD VALUE 1

| COMMAND | OPERATION |
|---|---|
| RETURN | TOUCH-UP FROM RETURN BUTTON, PRESS MENU BUTTON |
| CHANGE SETTINGS OF SELECTED FUNCTION ITEM | TOUCH-UP FROM FUNCTION ITEM, PRESS (MOVE) FOUR-WAY OPERATIONAL KEY, AND PRESS SET BUTTON (SELECT) |

FIG. 12D

MENU SCREEN: THRESHOLD VALUE 2

| COMMAND | OPERATION |
|---|---|
| CHANGE SETTINGS OF SELECTED FUNCTION ITEM | TOUCH-UP FROM FUNCTION ITEM, PRESS (MOVE) FOUR-WAY OPERATIONAL KEY, AND PRESS SET BUTTON (SELECT) |
| MOVE SELECTED FUNCTION ITEM | TOUCH-MOVE | much
ELECTRONIC APPARATUS AND CONTROL METHOD OF THE SAME

BACKGROUND OF THE INVENTION

Field of the Invention

The present invention relates to technology of detecting a touch operation at the time of receiving instruction input by touch operation.

Description of the Related Art

There are cases where apparatuses that accept user input by touch operations at a touch panel detect unintentional touch operations on the touch panel, resulting in erroneous operation.

Japanese Patent Laid-Open No. 2011-002891 discloses invalidating a touch in a case where the touch input to a touch panel has a predetermined area or more. Japanese Patent Laid-Open No. 2014-123327 discloses accepting a touch operation if there is a touch-move of a predetermined distance or more, even if the touch area on the touch panel is a predetermined area or more.

There is a possibility with the method described in Japanese Patent Laid-Open No. 2011-002891 that, if the area for invalidating touch input is set too small, and a touch operation having a large touch input area is performed, the touch operation is invalidated even if it was intentional. There is a possibility with the method described in Japanese Patent Laid-Open No. 2014-123327 that, while touch operations are accepted even if the touch area on the touch panel is a predetermined area or more as long as there is a touch-move of a predetermined distance or more, this may not necessarily be intended by the user, and accordingly actions not intended by the user may be performed. Thus, operationality is poor if actions are not performed when the user performs intentional touches, while the performance of actions due to touches not intended by the user is inconvenient.

SUMMARY OF THE INVENTION

Provided is an electronic apparatus that reduces the possibility that actions will be performed due to touch operations not intended by the user, while suppressing reduction in user operationality.

Provided is an electronic apparatus including: touch detector configured to be capable of detecting touch operations; and a controller configured to effect control to, in a state where a first screen is displayed, execute a function in accordance with a touch operation performed in a case where a touch area of the touch operation is smaller than a first area, and not execute a function in accordance with a touch operation performed in a case where the touch area of the touch operation is equal to or larger than the first area, and in a state where a second screen is displayed, execute a function in accordance with a touch operation performed in a case where the touch area of the touch operation is smaller than a second area that is larger than the first area, and not execute a function in accordance with a touch operation performed in a case where the touch area of the touch operation is equal to or larger than the second area.

Also provided is an electronic apparatus including: a touch detector configured to be capable of detecting touch operations; and a controller configured to effect control to, in a state of displaying a screen to which a function executable by an operation including moving a touch position has been assigned, execute a function in accordance with the touch operation performed in a case where the touch area of the touch operation is smaller than a first area, and not execute a function in accordance with a touch operation performed in a case where the touch area of the touch operation is equal to or larger than the first area, and in a state of displaying a screen to which a function executable by an operation including moving a touch position has not been assigned, execute a function in accordance with a. touch operation performed in a case where the touch area of the touch operation is smaller than a second area that is larger than the first area, and not execute a function in accordance with a touch operation performed in a case where the touch area of the touch operation is equal to or larger than the second area.

Further provided is an electronic apparatus including: a touch detector configured to be capable of detecting touch operations; and a controller configured to effect control to, in a state of displaying a screen including a displayed item that can be displayed in accordance with a touch operation having been performed, execute a function in accordance with the touch operation performed in a case where the touch area of the touch operation is smaller than a first area, and not execute a function in accordance with a touch operation performed in a case where the touch area of the touch operation is equal to or larger than the first area, and in a state of displaying a screen not displayed in accordance with a touch operation having been performed, execute a function in accordance with a touch operation performed in a case where the touch area of the touch operation is smaller than a second area that is larger than the first area, and not execute a function in accordance with a touch operation performed in a case where the touch area of the touch operation is equal to or larger than the second area.

Further features of the present invention will become apparent from the following description of embodiments with reference to the attached drawings.

BRIEF DESCRIPTION OF THE DRAWINGS

FIG. 3 is a flowchart of processing to detect a touch operation in the embodiment.

FIGS. 7A through 7E-3 are diagrams illustrating display examples of OLC-type screens, and display examples of quick settings screens.

FIGS. 12A-1 through 12D are diagrams illustrating operations accepted at each screen, and corresponding functions.

DESCRIPTION OF THE EMBODIMENTS

An embodiment of the present invention will be described in detail below with reference to the accompanying drawings. It is to be noted that the following embodiment is merely one example for implementing the present invention and can be appropriately modified or changed depending on individual constructions and various conditions of apparatuses to which the present invention is applied. Thus, the present invention is in no way limited to the following embodiment.

Figure 1A:
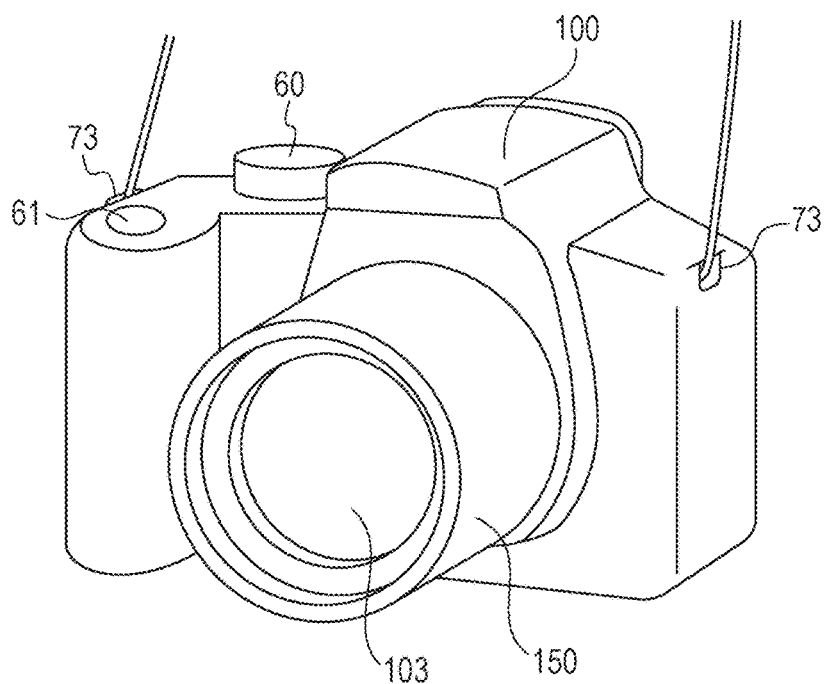
FIGS. 1A and 1B are external views of a digital camera, as an example of an apparatus to which the configuration of an embodiment is applicable.
Figure 1B:
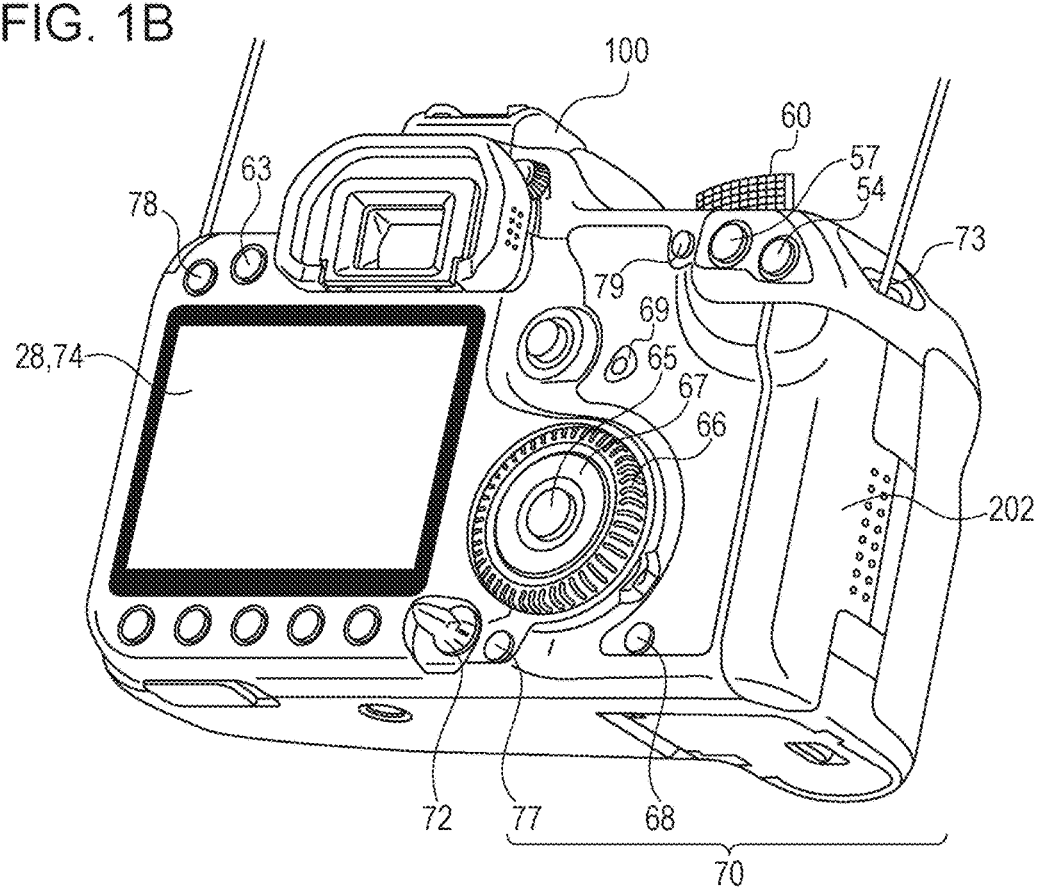
Figure 2A:
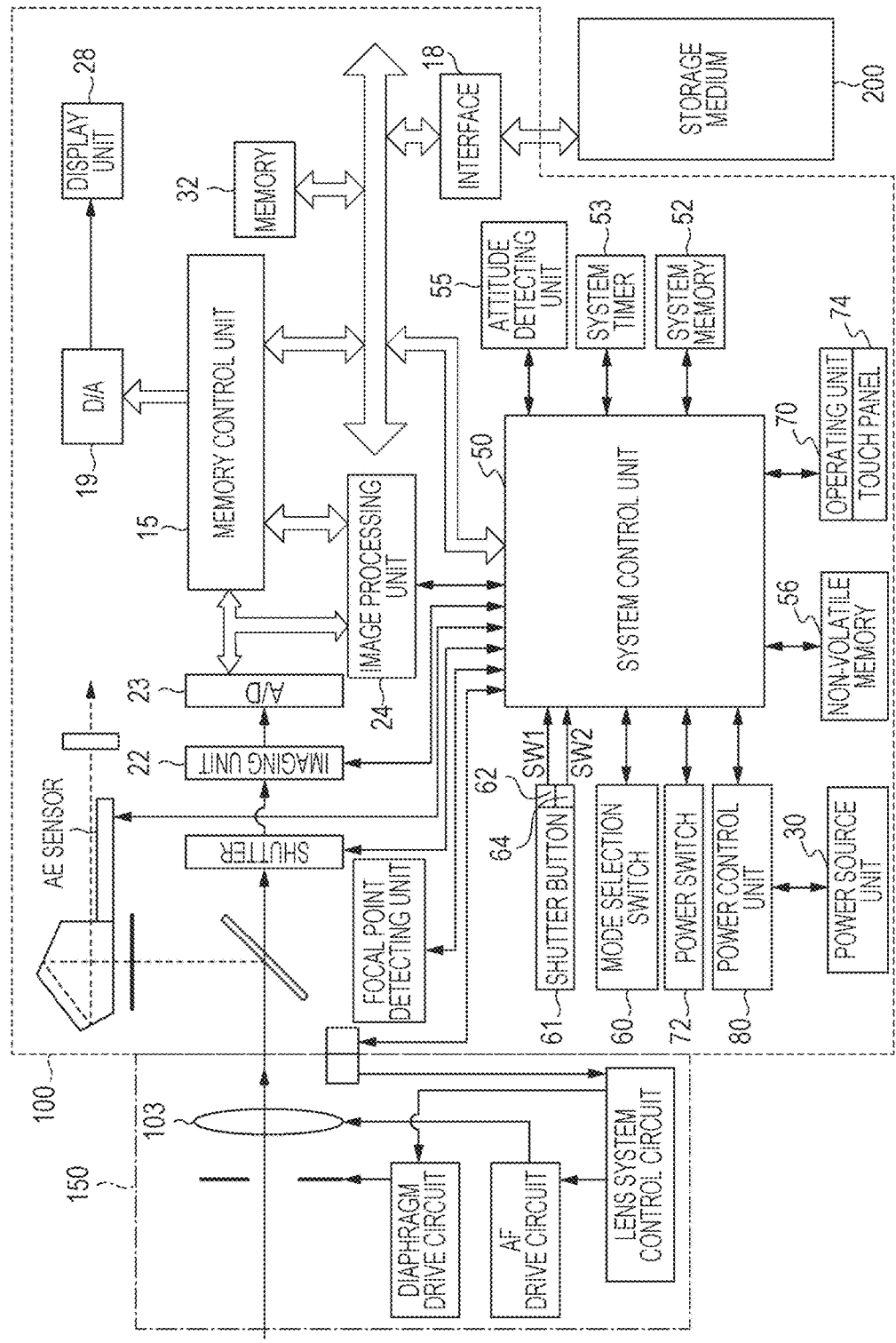
FIGS. 2A and 2B are block diagrams illustrating configuration examples a digital camera, as an example of an apparatus to which the configuration of an embodiment is applicable.
Figure 2B:
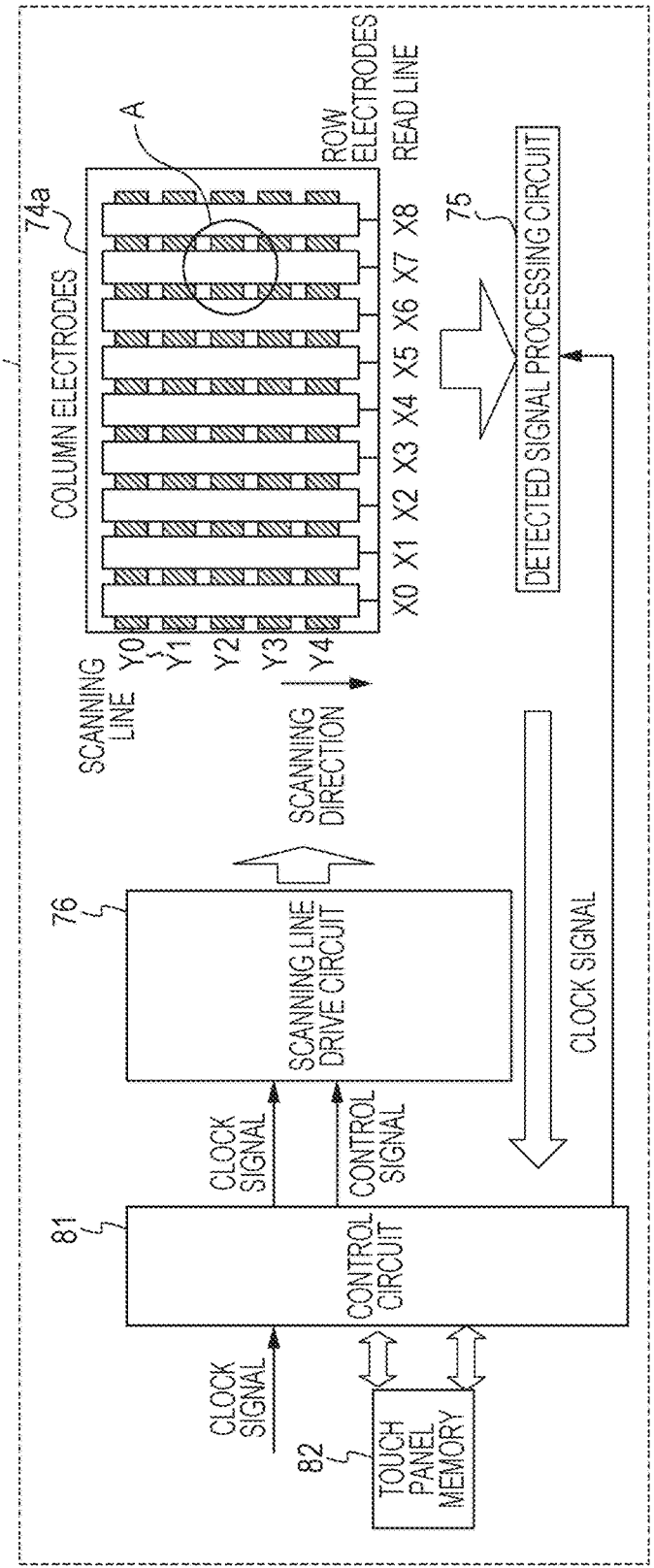

FIGS. 1A and 1B are external views of a digital camera 100 serving as an example of an electronic apparatus according to the present invention, and FIGS. 2A and 2B are block diagrams illustrating configuration examples of the digital camera 100 serving as an example of an electronic apparatus according to the present invention. FIG. 1A is a front face perspective view of the digital camera 100, and FIG. 1B is a rear face perspective view of the digital camera 100.

Figures 1, 4A:
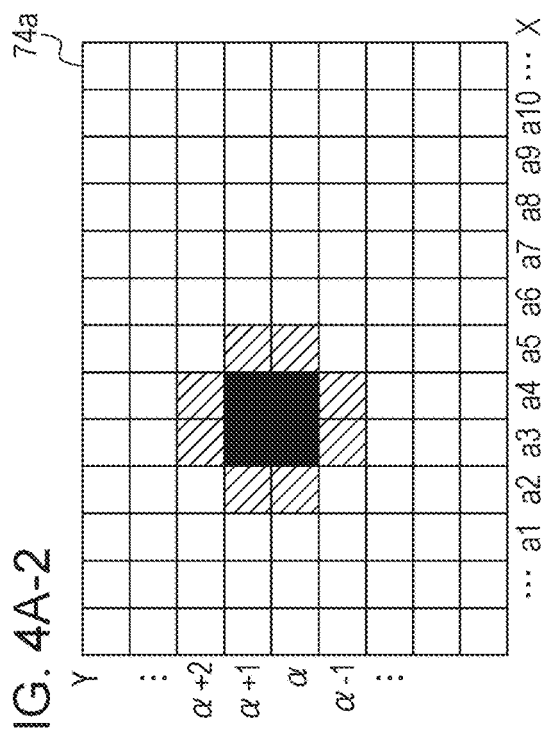
FIGS. 4A-1 through 4B-2 are diagrams for describing computation processing of touch area from a touch operation in the embodiment.

A shutter button 61 in FIG. 1(*a*) is an operation unit for performing image shooting instructions. A mode selection switch 60 is an operation unit for switching among various types of modes. A lens unit 150 is a lens group including a control unit that controls a lens 103 and the lens position, Strap portions 73 are portions to which a cord or strap for carrying the digital camera 100 is attached. FIGS. 1A and 1B illustrate the way in which a cord is passed through the strap portions 73. The user can hold the digital camera 100 with the strap passing over the neck or shoulders, such that the rear face side (face portion of display unit 28) where the lens unit 150 is not situated faces toward the user. In a state where the digital camera 100 is not held but hung from the neck by the strap, the face portion of the display unit 28 may come into contact with the body of the user, such as the abdomen, which may be determined to be a touch operation having been performed. If functions are executed by touch operations not intended by the user, there is the possibility that settings and functions not intended by the user will be executed (erroneous actions). Accordingly, such touch operations not intended by the user are determined to be invalid touch operations by control which will be described later, thereby reducing the possibility of erroneous actions.

In FIG. 1B, the display unit 28 is a display portion that displays images and various types of information. A touch panel 74 is capable of detecting touching of the display unit 28, and is overlaid on the display unit 28.

An electronic dial 66 is a rotational operating member included in an operating unit 70. Changing and so forth of setting values such as shutter speed, aperture, and so forth, can be performed by rotating the electronic dial 66. A four-way operational key 67 (four-direction key) is included in the operating unit 70, which can be pressed at each of up, down, left, and right portions. The four-way operational key 67 can perform operations in accordance with the portion pressed. A set button 65 is a pushbutton included in the operating unit 70, primarily used for deciding selection function items. A live view button 79 is included in the operating unit 70, for switching live view (hereinafter may be abbreviated to "LV") on and off. The live view button 79 is used for instructing starting and stopping of moving image shooting (recording) in the moving image shooting mode. A quick (Q)-settings button 69 is included in the operating unit 70, and displays a Q-settings screen (quick-settings screen) corresponding to each mode on the display unit 28. In the Q-settings screen, displayed items indicating settings-changeable function items in each mode are displayed. Further performing selection operations of the displayed items (via touch operation or operation of the operating unit 70) displays screens for performing detailed settings of the selected function item, thus enabling changes to settings of the function items to be performed easily. An info button 63 is a button for switching on and off displays such as information and guides on the display unit 28.

A zoom button 54 is included in the operating unit 70, and is an operation button to turn the zoom mode on and off in live view display in the shooting mode, and to change the zoom ratio while in the zoom mode, functioning to zoom in on a playback image when in playback mode, and to increase the enlargement ratio. A reduction button 57 is included in the operating unit 70, and is an operation button to reduce the zoom ratio of a playback image that has been zoomed in on, thereby reducing the displayed image. A playback button 77 is included in the operating unit 70, and is an operation button for switching between shooting mode and playback mode. Pressing the playback button 77 while in shooting mode transitions to the playback mode, and the newest image of the images stored in a storage medium 200 can be displayed on the display unit 28. A delete button 68 is included in the operating unit 70, and is a button to delete a selected image. A menu button 78 is a button included in the operating unit 70, to display a menu screen from which various types of settings in the current mode can be set, on the display unit 28. The user can intuitively perform various types of settings by operating the menu screen displayed on the display unit 28, and the four-directional button for up, down, left, and right (four-way operational key 67) and set button 65, and by touch operations on the touch panel 74.

A power switch 72 is an operating member to switch the power of the digital camera 100 on and off. A lid 202 is a lid for a slot where the storage medium 200 is stored, FIGS. 2A and 2B are block diagrams illustrating a configuration example of the digital camera 100 according to the present embodiment. The lens unit 150 in FIG. 2A is a lens unit equipped with an exchangeable shooting lens.

A lens 103 normally is configured including multiple lenses, but is illustrated here in a simplified manner as just a single lens. The lens unit 150 is a lens group including the lens 103, and is attachable to and detachable from the digital camera 100.

An imaging unit 22 is an imaging device configured including charge-coupled device (CCD) or a complementary metal-oxide semiconductor (CMOS) device or the like, that converts an optical image into electric signals. An A/D converter 23 is used to convert analog signals output from the imaging unit 22 into digital signals.

An image processing unit 24 subjects data from the A/D converter 23 or data from a memory controller (memory control unit) 15 to resizing processing such as predetermined pixel interpolation, reduction, and so forth, and color conversion processing. The image processing unit 24 performs predetermined computation processing using the imaged image data, and a system controller 50 performs exposure control and ranging control based on the computation results that are obtained. Accordingly, through-the-lens (TTL) type autofocus (AF) processing, automatic exposure (AE) processing, and flash preliminary emission (EF) processing are performed. The image processing unit 24 further performs predetermined computation processing using the imaged image data, and performs TTL type auto white balance (AWB) processing, based on the obtained computation results. The output data from the A/D converter 23 is directly written to memory 32 via the image processing unit 24 and memory controller 15, or via the memory controller 15.

The memory 32 stores image data acquired by the imaging unit 22 and converted into digital data by the A/D converter 23, and image data to be displayed on the display unit 28. The memory 32 has sufficient storage capacity to store a predetermined number of still images and a predetermined amount of time of moving images and audio. The memory 32 also serves as memory for image display (video memory). A D/A converter 19 converts data for image display that is sorted in the memory 32 into analog signals, and supplies to the display unit 28. Image data for display that has been written to the memory 32 is thus displayed on the display unit 28, via the D/A converter 19. The display unit 28 performs display on a display device such as a liquid crystal display (LCD) or the like, in accordance with analog signals from the D/A converter 19. Digital signals that have been temporarily subjected to A/D conversion by the A/D converter 23 and stored in the memory 32 are converted into analog signals at the D/A converter 19, and consecutively transferred to the display unit 28 and displayed, thus realizing functions of an electronic viewfinder, so live view display can be performed.

Non-volatile memory 56 is electrically erasable/recordable memory, Electrically Erasable Programmable Read-Only Memory (EEPROM) being used for example. The non-volatile memory 56 stores constants, programs, and so forth, for operation of the system controller 50. The term "programs" as used here means programs for executing various types of flowcharts described later in the present embodiment.

The system controller 50 controls the overall digital camera 100. The processes described later in the present embodiment are realized by executing the programs stored in the non-volatile memory 56. Constants, variables, programs read out from the non-volatile memory 56, and so forth, for operation of the system controller 50, are loaded to system memory 52, for which random access memory (RAM) or the like is used. The system controller 50 also performs display control by controlling the memory 32, D/A converter 19, display unit 28, and so forth.

A system timer 53 is a clocking unit that clocks time used for the various types of control, and time at a built-in clock.

An attitude detecting unit 55 detects the attitude of the digital camera 100 as to the gravitational direction. Whether images imaged at the imaging unit 22 are images taken with the digital camera 100 being held horizontally or taken being held vertically can be determined based on the attitude detected by the attitude detecting unit 55. The system controller 50 can add orientation information to image files of images imaged at the imaging unit 22, and can rotate images when recording, in accordance with the attitude detected by the attitude detecting unit 55. Acceleration sensors, gyro sensors, or the like, may be used as the attitude detecting unit 55.

The mode selection switch 60, shutter button 61, and operating unit 70 are operational mechanisms for input of various types of operation instructions to the system controller 50. The mode selection switch 60 switches the operating mode of the system controller 50 to one of still image mode, moving image shooting mode, playback mode, and so forth. Modes included in the still image mode include auto shooting mode, auto scene determining mode, manual mode, aperture prioritized mode (Av mode), and shutter-speed prioritized mode (Tv mode). Further provided are various scene modes for performing shooting settings based on the scene, program automatic exposure (AE) mode, custom mode, and so forth. The mode can be directly switched to one of the modes using the mode selection switch 60. Alternatively, an arrangement may be made where the mode selection switch 60 is first used to switch to the menu screen, after which another operating member is used to switch to one of these modes included in the menu. Similarly, multiple modes may be included in the moving image shooting mode.

A first shutter switch 62 turns on at a so-called half-press (shooting preparation instruction) partway through operation of the shutter button 61 provided to the digital camera 100, and generates a first shutter switch signal SW1. The first shutter switch signal SW1 starts operations such as AF processing, AE processing, AWB processing, EF processing, and so forth. A second shutter switch 64 turns on at a so-called full-press (shooting instruction) upon completion of operation of the shutter button 61, and generates a second shutter switch signal SW2. The system controller 50 starts the series of shooting processing from reading out signals from the imaging unit 22 to writing image data to the storage medium 200, based on the second shutter switch signal SW2.

The operating members of the operating unit 70 are assigned suitable functions for each screen, by performing selection operations of displayed items (function icons) displayed on the display unit 28 for various types of functions and so forth, and accordingly serve as various types of function buttons. Examples of function buttons are a termination button, a return button, an image feeding button, a jump button, a narrowing-down button, an attribute change button, and so forth. Upon the menu button 78 being pressed, for example, a menu screen from which various types of settings can be made is displayed on the display unit 28. The user can intuitively perform the various types of settings using the menu screen displayed on the display unit 28, and the four-way operational key 67 and set button 65.

The operating unit 70 is made up of various types of operating members serving as input units to accept user operations. The operating unit 70 includes the touch panel 74 illustrated in FIG. 1, and at least the following operating units, namely, the shutter button 61, the electronic dial 66, the power switch 72, the four-way operational key 67, the set button 65, the live view button 79, the zoom button 54, the reduction button 57, and the playback button 77. Some of the functions assigned to these buttons can be executed by touch operations on the touch panel 74. The touch panel 74 will be described later.

A power supply control unit 80 is configured including battery detecting circuit, a DC-DC converter, a switch circuit that switches blocks to be energized, and so forth, and detects whether or not a battery is attached, the type of the battery, and remaining battery level. The power supply control unit 80 controls the DC-DC converter based on the detection results thereof and instructions from the system controller 50, to supply various parts including the storage medium 200 with necessary voltage for a necessary amount of time.

A power source unit 30 is made up of a primary battery such as an alkali battery or a lithium (Li) battery or the like, a secondary battery such as a nickel-cadmium (NiCd) battery, a nickel-metal hydride (NiMH) battery, a Li battery, or the like, and an AC adapter or the like. The power switch 72 is an operating member to turn the power source of the digital camera 100 on and off.

A storage medium interface (I/F) 18 is an interface to the storage medium 200, for example, a memory card or hard disk. The storage medium 200 is a non-volatile storage medium such as a memory card or the like for storing images that have been shot, and is made up of semiconductor memory, a magnetic disk, or the like.

The touch panel 74 that can detect touch at the display unit 28 is part of the operating unit 70. The touch panel and the display unit 28 can be configured integrally. For example, the touch panel is configured so that the light transmittance does not impede display on the display unit 28, and is attached to the top layer of the display screen of the display unit 28. Input coordinates at the touch panel and display coordinates on the display unit 28 are then correlated. Accordingly, a graphical user interface (GUI) can be configured, whereby the user can seemingly directly operate the screen displayed on the display unit 28. The system controller 50 can detect the following operations and states at the touch panel.

A finger or pen, which had not been in contact with the touch panel, newly coming into contact with the touch panel, i.e., starting of a touch (hereinafter referred to as "touch-down").

A finger or pen being in contact with the touch panel (hereinafter referred to as "touch-on").

A finger or pen, in contact with the touch panel, moving (hereinafter referred to as "touch-move").

A finger or pen, which had been in contact with the touch panel, releasing contact, i.e., ending a touch (hereinafter referred to as "touch-up")

A state where nothing is in contact with the touch panel (hereinafter referred to as "touch-off").

When a touch-down is detected, the touch-on state is detected at the same time. After the touch-down, the touch-on continues to be detected unless a touch-up is detected. A touch-move is also detected in a touch-on state. Even if a touch-on is being detected, no touch-move is detected unless movement of the touch position is detected. After touch-up has been detected for all fingers or pens that had been in touch, the state is touch-off.

In a case where a certain touch-move follows a touch-down on the touch panel and then a touch-up is performed, this means that a stroke has been performed. A quick stroke operation is called a flick. A flick is an operation where the finger on the touch panel is quickly moved a certain amount of distance with the finger remaining in a touching state, and then released. In other words, this is an operation of quickly tracing the touch panel like flicking with the finger. When detection has been made that a touch-move of a predetermined speed or faster has been performed over a predetermined distance or longer, and then a touch-up is performed straightaway, a flick can be determined to have been performed. When detection has been made that a touch-move slower than the predetermined speed has been performed over a predetermined distance or longer, and then a touch-up is performed straightaway, a drag can be determined to have been performed.

These operations/states, and positional coordinates where fingers or pens are touching the touch panel, are notified to the system controller 50 through an internal bus. Determination of what sort of operations have been performed on the touch panel is made based on the notified information. For a touch-move, the movement direction of the finger or pen moving over the touch panel can be detected with regard to each of the vertical component and horizontal component on the touch panel, based on the change in positional coordinates. When detecting that a touch-move slower than the predetermined speed has been performed over a predetermined distance or longer, a drag is determined to have been performed. The touch panel may be any of various types of touch panels, including resistive film touch panels, capacitive touch panels, surface acoustic wave touch panels, infrared touch screens, electromagnetic induction touch panels, image recognition touch panels, optical sensing touch panels, and so forth. Some touch panels detect actual contact, while others detect proximity of a finger or pen; either may be used.

A threshold value regarding touch area is set to determine an unintentional touch operation, to distinguish unintentional touch operations from operations at the touch panel. Different threshold values are set in the present embodiment, depending on the screen being displayed. Although the threshold value in the present embodiment is set to one of a threshold value 1 (hereinafter, also referred to as an "area-related threshold value 1") and a threshold value 2 (hereinafter, also referred to as an "area-related threshold value2") that has a larger value than the threshold value 1, three or more threshold values may be provided. The threshold value set for each screen is stored in the non-volatile memory 56 in correlation with the screen, and called up when displaying each screen on the display unit 28.

The touch panel 74 will be described in detail with reference to FIG. 2B. A touch panel sensor 74a has multiple column electrodes (X0 through X8) arrayed in the horizontal direction, and multiple row electrodes (Y0 through Y4) arrayed in the vertical direction. The column electrodes and row electrodes form intersections with each other. A point A indicates a sensor intersection between column electrode X7 and row electrode Y2.

The row electrodes are connected to a constant current circuit, and the column electrodes are fixed to a predetermined potential. When a small current flows from the constant current circuit, a charge is accumulated in the mutual capacitance generated between the column electrode and the row electrode. Sub-scanning, where accumulation is performed multiple times per sensor intersection, is performed, and integrated at an integrating circuit. The measurement result per sensor intersection (one scan) is measured, and converted into a digital signal. The amount of change of this detected signal is measured as the amount of change in capacitance, whereby whether or not there is touch detection can be determined.

A scanning line drive circuit 76 is a circuit that sequentially selects and drives scanning lines. Faint current from the constant current circuit flows through the selected scanning lines. The number of sub-scans per scanning line can be optionally changed by a command from the system controller 50 to a control circuit 81. A detected signal processing circuit 75 is a circuit that sequentially selects read lines, and reads out detected signals.

The scanning line drive circuit 76 and the detected signal processing circuit 75 are driven by clock signals supplied from the control circuit 81. The control circuit 81 detects whether or not the detected signal value of each electrode detected by the detected signal processing circuit 75 is a certain touch determination threshold value or above, and if the value is the threshold value or above, the control circuit 81 attaches a touch detection flag to the data and sequentially transmits the data to touch panel memory 82. Upon scanning of one frame having been completed, touch-detected regions are grouped, and the center of the touch position is computed from the one frame of detection data stored in the touch panel memory 82, thereby calculating the number of touch detections, touch detection coordinates, and touched area. The touch area is calculated based on the total number of sensor intersections regarding which the amount of change in capacitance measured is not less than the threshold value (of the sensors included in the touch panel) in the present embodiment.

Detection of touch operations in the present embodiment will be described with reference to FIG. 3. In the present embodiment, detected touch operations at a threshold value set for each screen or above are assigned as being invalid, and touch operations otherwise are assigned as being valid, and a function is executed on valid touch operations. FIG. 3 is a diagram illustrating a flowchart of detecting touch operations, starting from turning on the power to the digital camera 100 and images or displayed items being displayed on the display unit 28. This processing is realized by programs stored in the non-volatile memory 56 being loaded to the system memory 52 and being executed by the system controller 50.

In S301, the system controller 50 determines whether or not there has been a touch operation on the touch panel 74. If determination is made that there has been a touch operation, the flow advances to S302; otherwise, the processing ends.

In S302, the system controller 50 computes a touch area M. The touch area M is calculated by the number of detected sensor intersections regarding which the amount of change in capacitance is not less than a touch area threshold value (hereinafter, also referred to as "capacitance-related threshold value 2"). The method of computing the touch area M will be described with reference to FIGS. 4A-1 through 4B-2.

Figures 2, 4A:
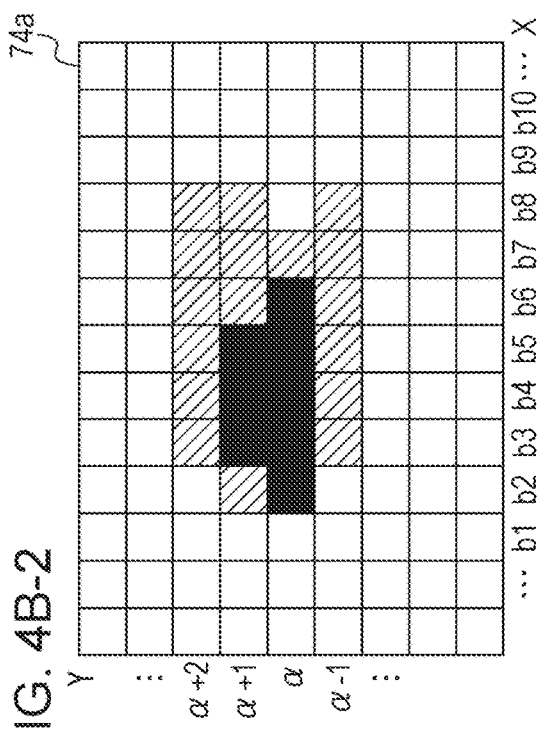
Figures 1, 4B:
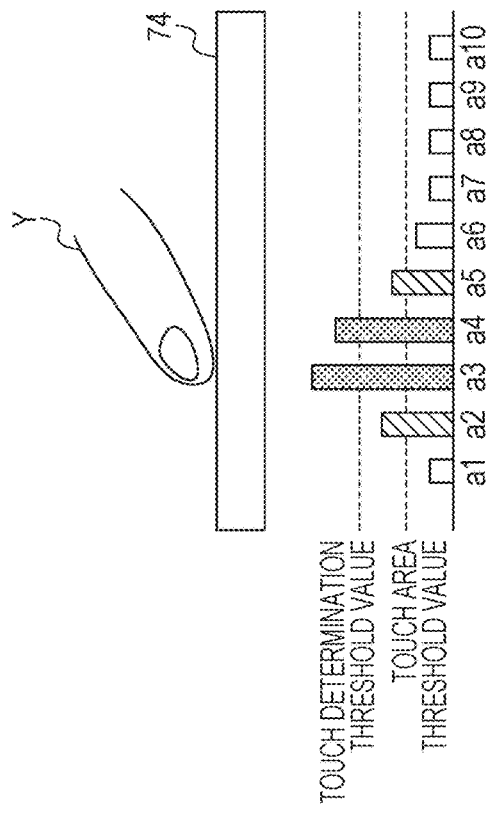
Figures 2, 4B:
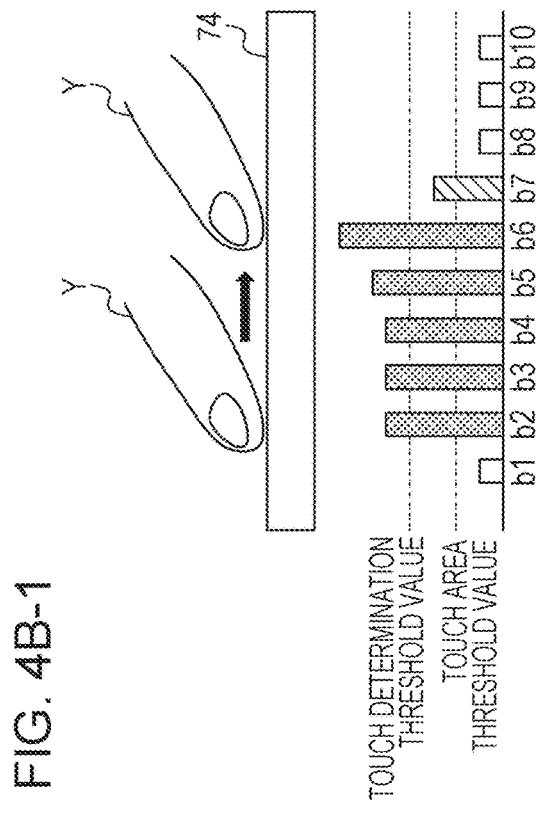

FIGS. 4A-1 through 4B-2 are diagrams for describing the method of computing the touch area from a touch operation to the touch panel 74, with FIGS. 4A-1 and 4A-2 illustrating a case of a touch-on by a single finger, and FIGS. 4B-1 and 4B-2 illustrating a case of a touch-move by a single finger (swipe, flick, etc.). FIGS. 4A-1 and 4B-1 illustrate the state of a finger Y of the user (electroconductive substance) as to the touch panel 74 (position of sensor intersection touched) as viewed from the side, and the amount of change in capacitance at each coordinate. FIGS. 4A-2 and 4B-2 illustrates the amount of change in capacitance at each sensor intersection, detected during 20 ms (milliseconds) at Y=$\alpha$, in accordance with X coordinates at each sensor intersection (a1 through a10 in FIG. 4A-2, b1 through b10 in FIG. 4B-2). The amount of change in capacitance is the amount of change in capacitance at each sensor intersection, generated between the finger Y and the touch panel 74 (the sum of the amount of change in capacitance detected within a predetermined amount of time). The touch area is calculated based on the number of sensor intersections where the amount of change in capacitance is the touch area threshold value, which is a threshold value of amount of change in capacitance, or above. A touch operation is deemed to have been performed at a sensor intersection regarding which an amount of change in capacitance is detected that is a touch determination threshold value (hereinafter also referred to as "capacitance-related threshold value 1") or above, the touch determination threshold value being larger than the touch area threshold value. Accordingly, the coordinates where the touch operation has been performed, and the type of touch operation, are determined. The touch area has a smaller threshold value than a touchdown, to facilitate detection of touch operations and the like with less force. This is to avoid accepting weak touch operations such as the abdomen of the user carrying the digital camera 100 brushing against the touch panel, as compared to the user intentionally performing touch operations using a strong force. Thus, the threshold value for detecting unintentional user operations, and the threshold value for determining touch operations intentionally performed by the user, are each set.

In FIG. 4A-1, the amount of change in capacitance detected at coordinates a1 and a6 through a10 are not larger than the touch area threshold value for determining whether or not to include the sensor intersections in the touch area, so these are not included in the touch area. The amount of change in capacitance detected at coordinates a2 and a5 are larger than the touch area threshold value, so these are included in the touch area, but are not larger than the touch determination threshold value for detecting a touch operation at the sensor intersections, so no touch operation is deemed to have been performed at these sensor intersections. The amount of change in capacitance detected at coordinates a3 and a4 are larger than the touch area threshold value, and also larger than the touch determination threshold value, and thus are included in sensor intersections for computing touch position, so a touch operation is deemed to have been performed at these sensor intersections.

FIGS. 4A-2 and 4B-2 illustrate a touch panel sensor 74a showing sensor intersections of the touch panel 74, where each sensor intersection has been replaced by one grid square. While FIGS. 4A-1 and 4B-1 illustrate only the amount of change in capacitance at sensor intersections where Y=$\alpha$, FIGS. 4A-2 and 4B-2 illustrate the amount of change in capacitance detected at Y=$\alpha$−1 through $\alpha$+2. The grid squares filled in with black represent sensor intersections where the amount of change in capacitance detected at these sensor intersections is the touch determination threshold value or above, and the grid squares indicated by hatching represent sensor intersections where the amount of change in capacitance detected at these sensor intersections is the touch area threshold value or above.

There are four grid squares filled in with black in FIG. 4A-2, so the area (number of sensor intersections) where a touch operation has been performed is four, and the coordinates obtained from the center of these four points is the coordinates of the touch-down point. The number of hatched grid squares is eight, so the number of sensor intersections at the touch area threshold value or above is 12, including the four black grid squares, and the touch area is 12.

There are eight grid squares filled in with black in FIG. 4B-2, so the area (number of sensor intersections) where touch operation has been performed is eight, and the touch-move distance is assumed to be the distance of b2 to b6. The number of hatched grid squares is 17, so the number of sensor intersections at the touch area threshold value or above is 25, including the eight black grid squares, and the touch area is 25.

In the present embodiment, the area-related threshold value 1 (number of sensor intersections) is 16, and the area-related threshold value 2 is 30, so in the case in FIG. 4A-2, the touch area is smaller than both the area-related threshold value 1 and the area-related threshold value 2, so the touch operation is determined to be valid. In the case in FIG. 4B-2, the touch area is smaller than the area-related threshold value 2 but is at the area-related threshold value 1 or above, so the touch operation is determined to be invalid in a case where the area-related threshold value 1 has been set but valid in a case where the area-related threshold value 2 has been set. The area of the touch panel 74 touched in a predetermined period of time tends to be larger in the case of a touch-move as compared to a touch-down, since the touch position moves, and in a case where a threshold value has been set, more readily reaches the threshold value. Accordingly, a touch-move is more readily determined to be an invalid touch operation if the threshold value is set small, but can be determined as a valid touch operation if the threshold value is set larger. However, setting the threshold value so as to be large in all cases will result in all touch operations below the threshold value being determined to be valid, and functions not intended by the user may be executed. On the other hand, setting the threshold value so as to be low may result in a touch-move not readily being determined to be a valid touch operation. Note that computation of the touch area may be performed by the control circuit 81 of the touch panel 74 itself (control circuit 81) rather than the system controller 50, in which case the system controller 50 reads in the computed touch area.

In S303, the system controller 50 determines whether or not the threshold value for determining touch operations not intended by the user, that is set for the currently-displayed screen, has been set as the threshold value 1. In a case where determination is made that the threshold value is set to the threshold value 1 the flow advances to S304, and otherwise (i.e., in a case of having been set to the threshold value 2) advances to S305.

In S304, the system controller 50 determines whether or not the touch area computed (detected) in S302 is the threshold value 1 (area-related threshold value 1; touch area of 16) or above. That is to say, determination is made in S302 regarding whether the number of sensor intersections regarding which the amount of change in capacitance is the touch area threshold value (capacitance-related threshold value 2) or above is less than 16. If determination is made that the touch area is 16 or above, the flow advances to S313; otherwise, the flow advances to S306.

In S305, the system controller 50 determines whether or not the touch area computed in S302 is the threshold value 2 (area-related threshold value 2; touch area of 30) or above. That is to say, determination is made in S305 regarding whether the number of sensor intersections regarding which the amount of change in capacitance is the touch area threshold value (capacitance-related threshold value 2) or above is less than 30. If determination is made that the touch area is 30 or above, the flow advances to S313; otherwise, the flow advances to S306.

In S306, the system controller 50 determines whether or not the touch operation detected in S301 was a touch-move. If determination is made that this was a touch move, the flow advances to S307; otherwise, the flow advances to S310. In a case where the touch operation was not a touch-move, determination is made that the touch operation was a touch-up after a touch-down (hereinafter, referred to simply as "touch-up"). In a case where the touch area of the touch detected in S301 is the threshold value (threshold value 1 or 2) or above, and the touch operation has been found to be unintended by the user, this processing is not performed. In the present embodiment, selection of a function item is decided (set) in accordance to a touch-up being performed at (from) a displayed item corresponding to the function item. Note that a function item at which a touch-down is performed is set as a candidate of a selected function item (a function item that is selected upon touch-up being performed), and function items set as options by performing a touch-move over multiple displayed items differ according to the touch position.

In S307, the system controller 50 determines whether or not a function executed by a touch-move operation has been assigned to a region where a touch-move has been detected. FIG. 12 illustrates touch operations and button operations (pressing buttons) in each screen (display mode), and functions corresponding to each operation. In each screen, when touch operations or button operations that correspond are detected, commands for executing the functions are notified. Upon being notified of the command, the system controller 50 executes the function. In a case where there is a function corresponding to a touch-move operation in FIG. 12 illustrating operations and commands for the screen being displayed, determination is made that a function has been assigned. In a case where determination is made that there is a touch-move-assigned function, the flow advances to S308; otherwise, the flow advances to S309.

In S308, the system controller 50 makes notification of the command for the function assigned to the touch-move. Functions assigned to touch-moves are image feed in playback mode, moving selected function items in the menu screen, and so forth. Pinch-out and pinch-in operations to zoom in or to reduce images being display are also included in touch-moves. A pinch-out is an operation of increasing the distance between two fingers touching the touch panel, and a pinch-in is an operation of reducing the distance between two fingers touching the touch panel.

In S309, the system controller 50 ends the processing without notifying of a command to execute a function, since there are no functions assigned to a touch-operation.

In S310, the system controller 50 determines whether or not a function executed by a touch-up has been assigned to the region where a touch-up has been performed. In a case where there is a function corresponding to a touch-up operation in FIG. 12 illustrating operations and commands for the screen being displayed, determination is made that a function has been assigned. In a case where determination is made that there is an assigned function, the flow advances to S311; otherwise, the flow advances to S312.

In S311, the system controller 50 makes notification of the command for the function assigned to the touch-up region determined in S310. Examples of functions executed by a touch-up include a function of transitioning to a Q settings screen in accordance with a touch-up being detected from the region of a Q settings touch button 701, illustrated in FIG. 7A. Functions such as deleting images, okaying selected function items, and so forth, can also be executed by touch-ups.

In S312, the system controller 50 ends the processing without notifying of a command to execute a function, since there are no functions assigned to a touch operation.

In S313, the system controller 50 performs processing to invalidate the touch detected in S301. That is to say, a touch operation was detected but the touch area was the threshold value or above, so determination is made that the touch operation was not intended by the user, and no command for executing a function is notified, so that processing according to the touch operation is not executed. Alternatively, notification is made that the touch operation was not intended by the user, and that the function is not to be executed. Further, as long as the touch of the touch operation is still on the touch panel, no command according to the touch operation is notified. That is to say, even if releasing of the touch operation, or a drag or flick which is performed by moving the touch operation is detected, no corresponding function is executed.

Accordingly, in a case where a detected touch area is a threshold value set for the screen being displayed or above, this is deemed to be a touch operation not intended by the user, and processing is not executed (the touch operation is invalidated) in the present embodiment. On the other hand, if the touch area is smaller than the threshold value set for the screen, the processing is executed (the touch operation is validated).

Figure 5:
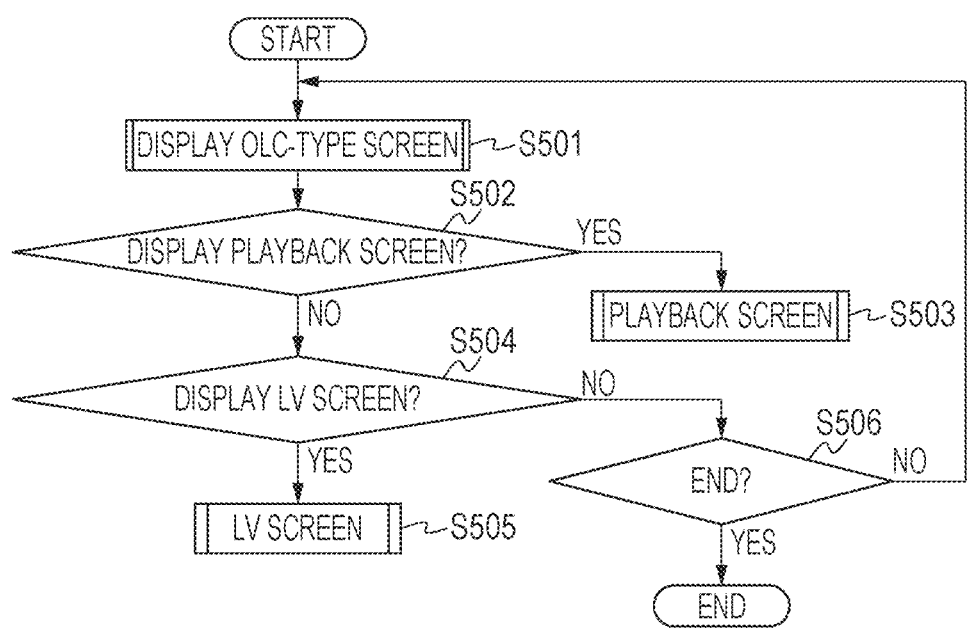
FIG. 5 is a flowchart of display processing on a display unit in the embodiment.

Next, the processing of display on the display unit 28 according to the present embodiment will be described with reference to FIG. 5. The flowchart in FIG. 5 is started when the power of the digital camera 100 is turned on. This processing is realized by programs stored in the non-volatile memory 56 being loaded to the system memory 52 and being executed by the system controller 50.

In S501, the system controller 50 displays a shooting settings screen (referred to as "OLC-type screen") on the display unit 28. Display of the OLC-type screen will be described later in detail with reference to the flowchart for OLC-type screen display in FIGS. 6A and 6B.

In S502, the system controller 50 determines whether or not to display a playback screen. The playback screen (playback mode) is displayed by pressing the playback button 77, and when the playback button 77 is pressed again the screen returns to the original screen. In a case where determination is made to display the playback screen, the flow advances to S503; otherwise, the flow advances to S504.

In S503, the system controller 50 displays the playback screen on the display unit 28. Display of the playback screen will be described later in detail with reference to the flowchart for playback screen display in FIGS. 8A and 8B.

In S504, the system controller 50 determines whether or not to display an LV image. The LV image is displayed by pressing the live view button 79, and when the live view button 79 is pressed again the screen returns to the original screen. Alternatively, the LV screen is displayed in accordance with switching to the moving image shooting mode, and the LV screen ends when switching from the moving image shooting mode to another shooting mode. When the live view button 79 is pressed when in the moving image shooting mode, moving image shooting recording starts.

In S505, the system controller 50 displays the live view screen on the display unit 28. Display of the live view screen will be described later in detail with reference to the flowchart for live view screen display in FIGS. 10A and 10B.

In S506, the system controller 50 determines whether or not display on the display unit 28 has ended. Ending of display on the display unit 28 includes the power of the digital camera 100 having been turned off, the display of the display unit 28 being turned off due to operations of the digital camera 100 including touch operations having not been performed for a predetermined period, and so forth. Note however, that unless the power of the digital camera 100 goes off, the display of the display unit 28 is started again by pressing the playback button 77 or the live view button 79.

Thus, upon the power being turned on for the digital camera 100, display can be performed in the OLC-type screen (standby mode), playback screen, and LV screen (standby mode). Touch operations can also be accepted. In each screen, when a button to display another screen is pressed, the screen switches to that screen corresponding to the button that was pressed. For example, if the playback button 77 is pressed while displaying the live view screen, the screen switches to the playback screen. Transitioning operations to another screen include displaying the playback screen by pressing the playback button 77, displaying the menu screen by pressing the menu button 78, displaying the LV screen by pressing the live view button 79, displaying a shooting screen by pressing the shutter button 61, and so forth.

Next, the flowchart for display of the OLC-type screen will be described with reference to FIGS. 6A and 6B. This processing is the processing of S501 in FIG. 5 in detail, and is a flowchart of display of the screen displayed on the display unit 28 when the power of the digital camera 100 is first turned on (initial screen). This processing is realized by programs stored in the non-volatile memory 56 being loaded to the system memory 52 and being executed by the system controller 50.

Figure 7A:
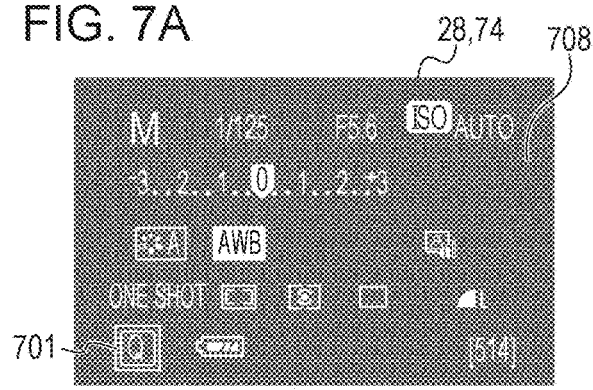

In S601, the system controller 50 displays an OLC-type screen 708, illustrated in FIG. 7A, on the display unit 28. In FIG. 7A, the Q settings touch button 701 in the OLC-type screen 708 executes functions upon having received a touch operation, but other displayed function items do not execute functions even if touch operations are performed. FIG. 7A illustrates the OLC-type screen, FIG. 7B illustrates the Q-settings screen (quick-settings screen), and FIG. 7C illustrates a display example of a function item settings screen from the Q-settings screen.

In S602, the system controller 50 sets the threshold value for determining a touch operation not intended by the user to threshold value 1. The set threshold value is stored in the system memory 52 as a set value, and is used for comparison of touch area, as in S304 in FIG. 3.

In S603, the system controller 50 performs the touch operation determination processing described in FIG. 3. Determination is performed regarding the touch operation shown in FIG. 12A-1.

In S604, the system controller 50 determines whether or not one of the following has occurred; a command has been notified in the processing in S603 to display the Q-settings screen, or a command has been notified to display the Q-settings screen due to the Q-settings button 69 having been pressed. That is to say, determination is made regarding whether or not either a touch-up has been performed from the Q settings touch button 701 or the Q-settings button 69 has been pressed. In a case where determination is made that a command has been notified to display the Q-settings screen, the flow advances to S605, and otherwise, the flow returns to S603. FIG. 12A-1 illustrates the operation and corresponding command for the OLC-type screen. This shows that the command to display the Q-settings screen is notified by a touch-up from the Q settings touch button 701, or by the Q-settings button 69 being pressed.

In S605, the system controller 50 displays a Q-settings screen 709 in the OLC-type screen illustrated in FIG. 7B, on the display unit 28. The Q-settings screen 709 shows a list of displayed items indicating function items regarding which settings can be changed. The displayed items enclosed by heavy lines are function items selectable by touch operations (and also function items regarding which settings can be changed). The displayed items not enclosed like M (displayed on the upper lift side) are not selectable by touch operation. Performing a touch-up from each displayed item transitions to the hierarchical level to change the settings of the selected function item (the hierarchical level goes one level down). In the Q-settings screen, settings of the function items can be easily changed by performing touch-ups on displayed items of function items. The hierarchical order of the screens is, from top to bottom, the OLC-type screen, the Q-settings screen, and the function item settings screen.

In S606, the system controller 50 sets the threshold value (area-related threshold value) to threshold value 1.

In S607, the system controller 50 performs the touch operation determination processing described in FIG. 3. Determination is made regarding the touch operations illustrated in FIG. 12A-2. In S608, or in response to the menu button 78 having been pressed in the processing in S607, the system controller 50 determines whether or not a command has been notified to return to the original screen. As shown in FIG. 12A-2, determination is made regarding whether or not a touch-up has been performed from a return button 702, or the menu button 78 has been pressed. FIG. 12A-2 shows operations corresponding to commands that can be notified in the Q-settings screen. In a case where determination is made that a return command has been notified, the flow returns to S601; otherwise, the flow advances to S609.

In S609, the system controller 50 performs the touch operation determination processing described in FIG. 3. Determination is made regarding the touch operations illustrated in FIG. 12A-2.

In S610, due to a touch operation (notified by processing in S609) or due to the four-way operational key 67 and set button 65 being pressed, the system controller 50 determines whether or not a settings-changeable function item displayed in the Q-settings screen 709 being displayed has been selected. In a case where determination is made that a function item has been selected, the flow advances to S611; otherwise, the flow returns to S607. In a case of changing the shutter speed, function item selection can be performed by a touch-up from a shutter speed button 703. The shutter speed button 703 is a displayed item that shows that the currently-set shutter speed is ⅟125. In a case of changing the ISO sensitivity, or in a case of changing the picture style, function item selection can be performed by performing a touch-up from an ISO sensitivity button 711 or picture style button 712, respectively.

In S611, the system controller 50 displays the function item settings screen selected in S610. The system controller 50 also starts clocking time T to determine whether a predetermined time has elapsed. In a case of dividing screens into multiple hierarchical levels such as with the OLC-type screen, Q-settings screen, and function item settings screen, if a predetermined amount of time elapses after having transitioned from a higher order hierarchical level to a lower order hierarchical level, the screen returns to the original screen (the screen at one hierarchical level above). The highest hierarchical level of the function item settings screens for each of the function items, displayed in accordance with function items being selected from the Q-settings screen (the hierarchical level of the screen first displayed), is the same. Note, however, that not all function item settings screens are on a single hierarchical level; some function item settings screens are at a lower hierarchical level for performing changes to settings for function items selected regarding a function item settings screen at a yet higher hierarchical level. Touch operations for changing settings of function items include a touch-move on scale marks, touch-up from a displayed item indicating a settings value or a settings candidate, touch-up from a displayed item to change a value, and so forth. Changing settings by touch operations in a function item settings screen will be described later with reference to FIGS. 7C through 7E-3.

In S612, the system controller 50 sets the threshold value to threshold value 2. Setting the threshold value 2 increases the value of the threshold value in accordance with the function item settings screen having been displayed, and enables touch operations to be detected more readily. Particularly, a touch-move is less readily determined to be a touch operation not intended by the user when the threshold value is high, so a higher threshold value improves operationality in screens where settings can be changed by touch-moves, such as shutter speed and the like.

In S613, the system controller 50 determines whether or not a predetermined amount of time to return to the Q-settings screen has elapsed. In a case where determination has been made that a predetermined amount of time has elapsed in a state with no operations, the flow returns to S601 and displays the OLC-type screen on the display unit 28 again; otherwise, the flow advances to S614.

In S614, the system controller 50 performs the touch operation determination processing described in FIG. 3. Determination is made regarding the touch operations illustrated in FIG. 12A-3.

In S615, by touch operation (notified in the processing in S614) or due to the four-way operational key 67 and set button 65 having been pressed, the system controller 50 determines whether or not a command has been notified by which settings of a function item that is currently selected are changed. In a case where determination is made that a settings change command has been notified, the flow advances to S616; otherwise, the flow advances to S617. The operation corresponding to the settings change command for the selected function item in the Q-settings screen differs depending on the selection format. FIG. 12A-3 is a compilation of commands for performing settings change operations for function items, and operations for notifying the commands. In FIG. 12A-3, function item settings screens have been classified into a numerical value setting format and a function item selection format, according to whether or not touch-move setting operations can be performed. The selection format includes the numerical value setting format where numerical values are set to function items by moving a displayed item indicating numerical values displayed on a scale or a bar, and the function item selection format where multiple candidate displayed items are displayed, and displayed items are selected to set to function items. Operations corresponding to the commands differ depending on whether the screen accepts selection operations in the numerical value setting format or in the function item selection format.

Changing settings of function items by touch operations in each settings screen will be described with reference to FIGS. 7C through 7E-3. FIG. 7C illustrates a function item settings screen 710 for shutter speed. The value of the shutter speed can be changed by performing a slide operation (touch-move) of a displayed item 705 representing shutter speed in the settings in a setting region 704. Performing a touch-up from displayed item 707 representing "fast" increases the shutter speed, and performing a touch-up from displayed item 706 representing "slow" reduces the shutter speed. Touching up from a return button 722 returns the screen to the Q-settings screen 709 which is the original image.

Figure 7D:
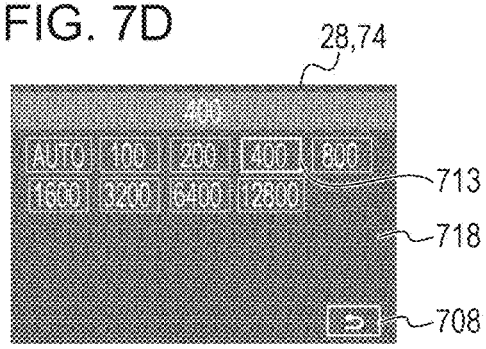
Figure 7B:
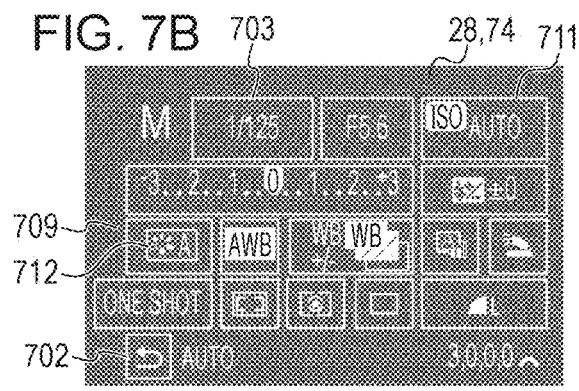

FIG. 7D illustrates a function item settings screen 718 for ISO sensitivity. The ISO sensitivity can be changed by performing a touch-up from the displayed item showing the required value. A setting value of ISO sensitivity 400, which the displayed item 713 shows, has been selected in the function item settings screen 718. To set the ISO sensitivity to another settings value (settings candidate), a touch-up operation can be performed from the displayed item of a function item showing another settings value.

Figures 1, 7E:
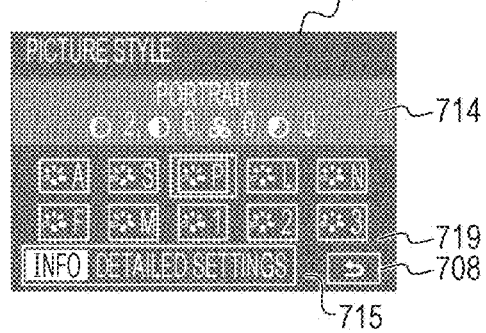
Figure 7C:
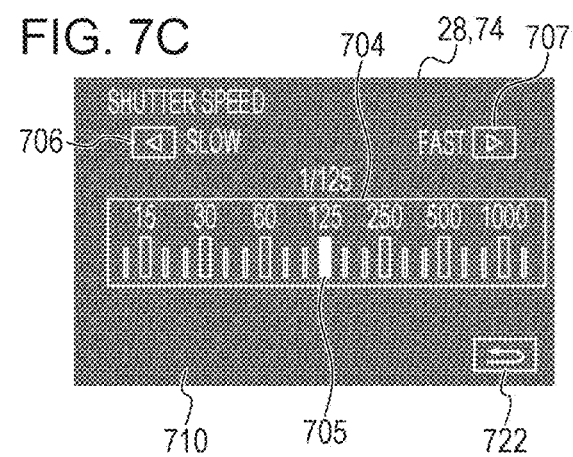
Figures 2, 7E:
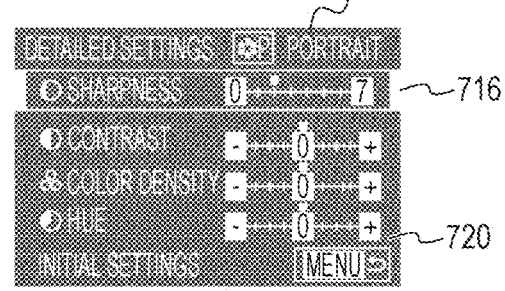
Figures 3, 7E:
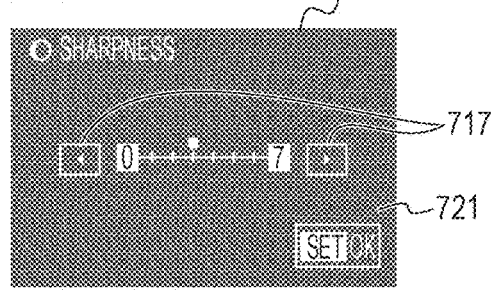

FIGS. 7E-1 through 7E-3 illustrate the function item settings screen 719 for picture style. FIG. 7E-1 is a screen of the upper hierarchical level of the function item settings screen, where setting candidates (A for auto, S for standard, P for portrait, etc.) to set the picture style can be selected by touch-up operations from displayed items representing the candidates. In the function item settings screen 719, the selection candidate for portrait, indicated by the displayed item 714, has been selected. Performing a touch-up on a display button 715 for detailed settings brings up a detailed settings screen 720 (middle-hierarchical-level function item settings screen) illustrated in FIG. 7E-2. Further, performing a touch-up on a displayed item 716 indicating sharpness, for example, brings up a sharpness settings screen 721 (lower-hierarchical-level function item settings screen) illustrated in FIG. 7E-3, for performing sharpness settings. Settings values for adjusting the intensity of sharpness can be changed by a touch-up operation at arrow 717 or a touch-move operation.

In S616, the system controller 50 sets the setting values (numerical values) or setting candidates (function items) selected at the settings screens for each function item. Once the changes to settings are performed for each of the function items, the flow advances to S613 again.

In S617, the system controller 50 performs the touch operation determination processing described in FIG. 3, In S618, the system controller 50 determines whether or not a command has been notified to return to the original screen, in the same way as in S608. Note however, that in S618, determination is made regarding whether or not a command has been notified to return to the original screen in S617, not in S607. In a case where determination is made that a command has been notified to return, the flow advances to S605; otherwise, the flow advances to S613. At the time performing determination regarding whether or not a function command has been notified, determination is made regarding whether the notification was made in the immediately-preceding step.

As described above in the flowchart, the threshold value for determining touch operations not intended by the user is higher at screens lower in the hierarchy of screens displayed on the display unit 28. The threshold value is lower at screens higher in the hierarchy, and detection is more readily made that the touch operation is not intended by the user, so it is less easy to advance to screens lower in the hierarchy. Accordingly, even if a touch operation is performed at the display unit 28 regardless of user intent, a situation where screens lower in the hierarchy are advanced to and settings changing operations are performed happens less readily. The lower the hierarchical level, the higher the threshold value is, so touch-move operations and the like are more readily detected, and operationality at the time of the user actually performing setting operations is better.

In the screen first displayed on the display unit 28 at the time of turning the power from off to on (the OLC-type screen in the present embodiment), the threshold value is set low, so as to make it difficult to transition to a screen in the next hierarchical level, regardless of user intent. The screen displayed on the display unit 28 when the power is turned from off to on is likely to come into unintentional contact with the body of the user if the user has turned on the power but has performed no operations, and is walking with the digital camera 100 hung from his/her neck. That is to say, this is a screen where erroneous actions can easily occur due to touch operations not intended by the user. By setting the OLC-type screen to the threshold value 1 which is a threshold value lower than other screens, a situation where the screen transitions from the OLC-type screen to another screen where settings are changed, due to touch operations not intended by the user, occurs less readily. As a result, changes to settings and execution of functions are harder to occur, and erroneous actions occur less readily.

While the threshold value is set in two stages in the processing described above, the threshold value may be set for each hierarchical level. That is to say, the threshold value may be increased in the order of OLC-type screen, Q-settings screen, and function item settings screen. Note, however, that simply making the threshold value at the upper hierarchical level small is not the entire answer, and that the threshold value should be larger than the size of the smallest displayed item out of the displayed items representing function items that are to be selected from the screens by touch-down operations. If the area for determining a touch operation not intended by the user is smaller than the size of the displayed item, there is the possibility that the touch-down operation will not be detected when the user performs a touch-down operation on the displayed item, but if the size is larger than the displayed item, user operationality does not readily decrease.

Also, while description has been made regarding increasing the threshold value the lower the hierarchical level is, an arrangement may be made where the higher the hierarchical level is, the higher the threshold value is, and the lower the hierarchical level is, the lower the threshold value is. Since the function item setting operations are performed at screens lower in hierarchical level, even if the screen transitions to a lower hierarchical level unintended by the user, settings and changes to function items will ultimately be more difficult to occur if the threshold value at the lower hierarchical levels is set low. Accordingly, a situation where functions unintended by the user are executed does not readily occur.

Figure 8A:
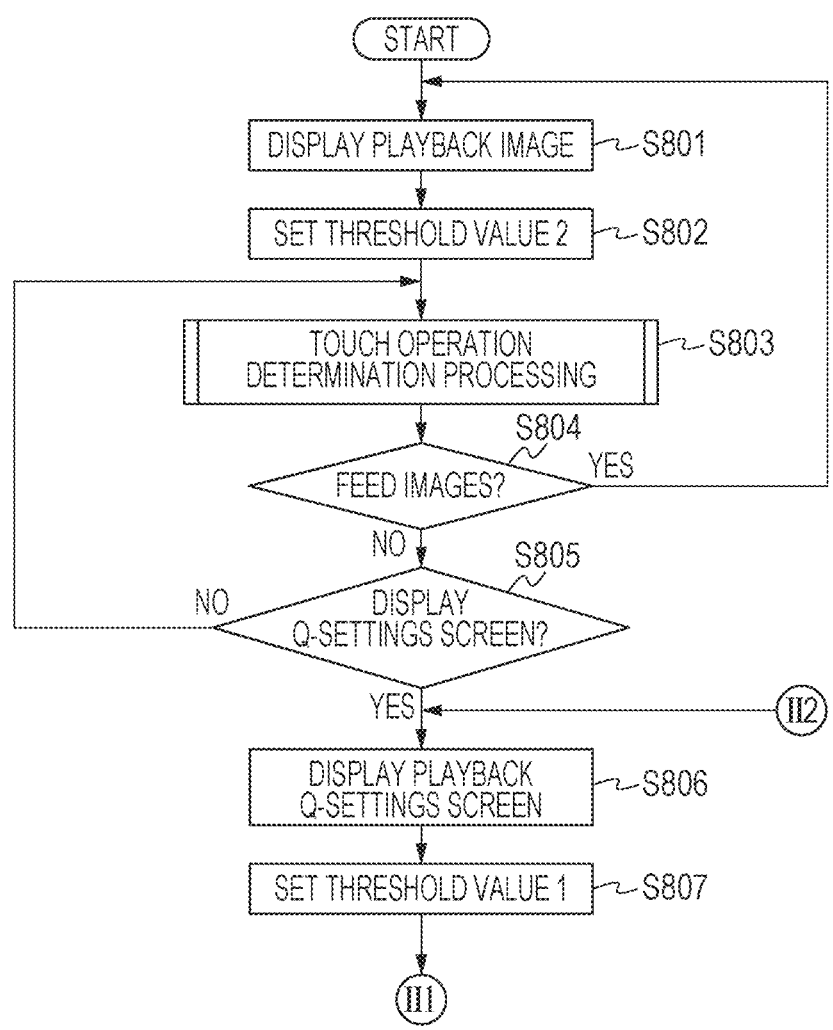
FIGS. 8A and 8B are flowcharts of playback screen display processing in the embodiment.
Figure 8B:
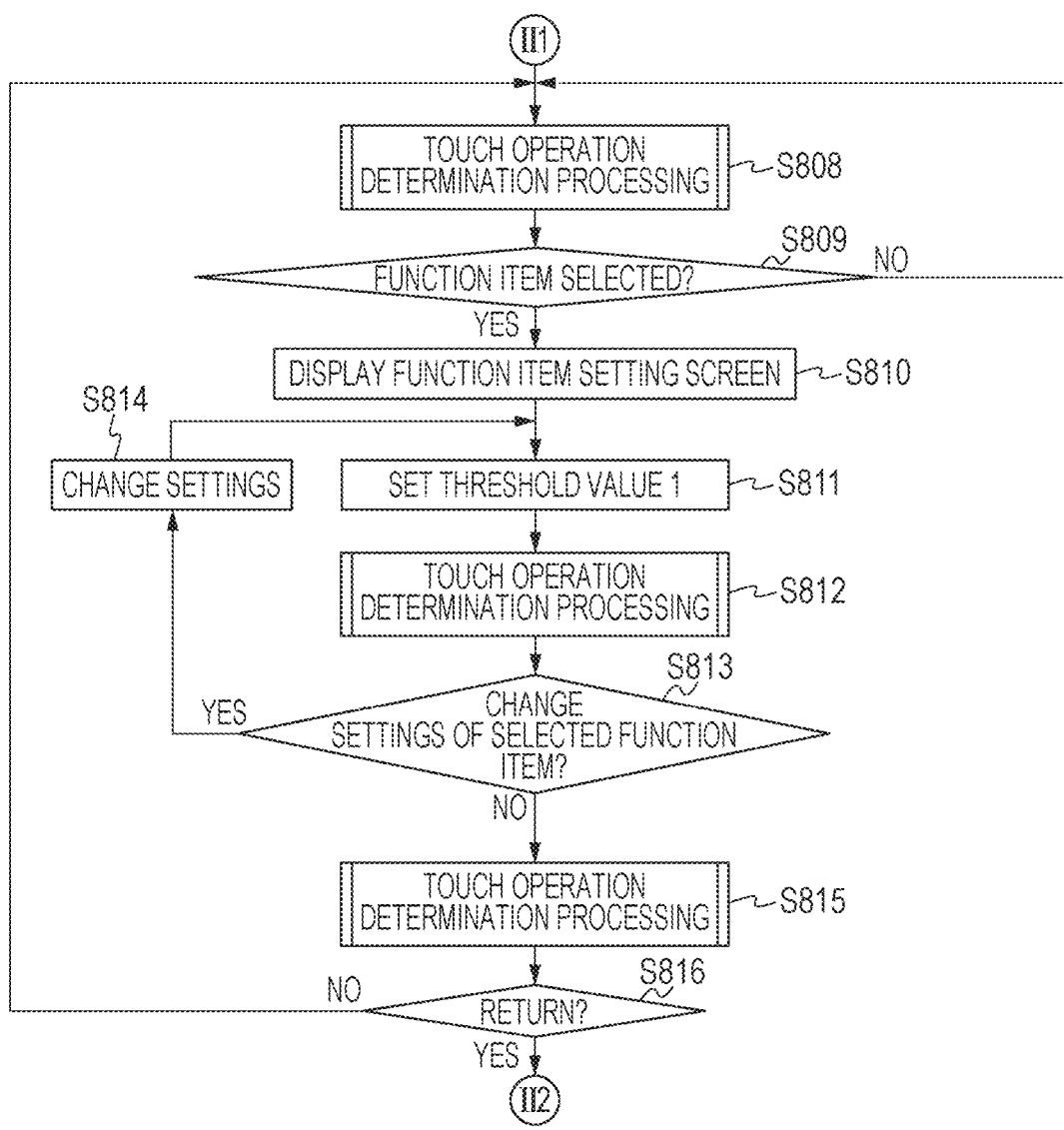

Next, the flowchart for display of the playback screen will be described with reference to FIGS. 8A and 8B. This processing is the processing of S503 in FIG. 5 in detail. This processing is realized by programs stored in the non-volatile memory 56 being loaded to the system memory 52 and being executed by the system controller 50.

Figure 9A:
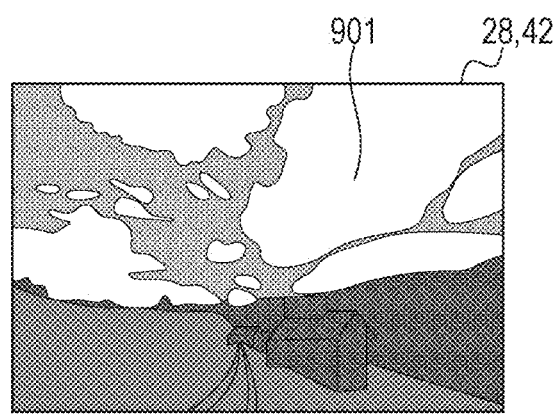
FIGS. 9A through 9C are diagrams illustrating display examples of playback images.
Figure 9B:
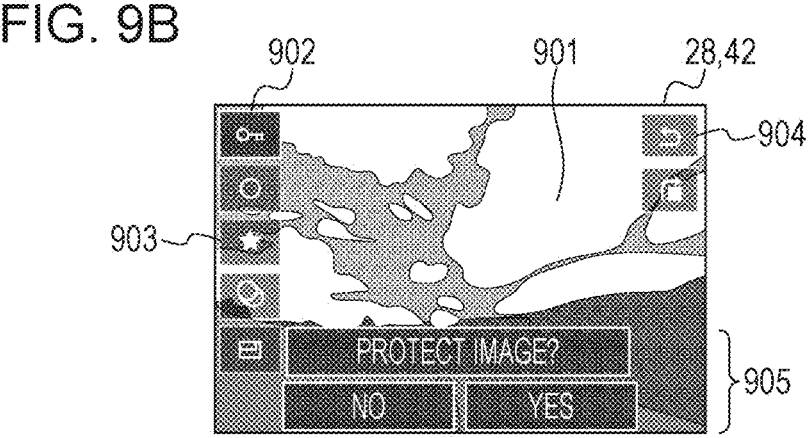
Figure 9C:
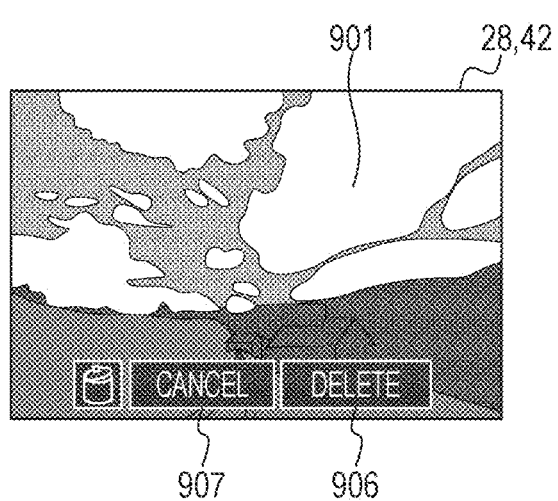

In S801, the system controller 50 displays a playback image on the display unit 28. FIG. 9A shows a playback image 901. When the playback button 77 is pressed, the newest of the images stored in the storage medium 200 is displayed. FIGS. 9A through 9C illustrate display examples of a playback image, FIG. 9A showing a playback image, FIG. 9B showing a playback Q-settings screen (playback image and Q-settings function items), and FIG. 9C showing a display example of a confirmation window before deleting a playback image being displayed.

In S802, the system controller 50 sets the threshold value for determining touch operations not intended by the user to threshold value 2.

In S803, the system controller 50 performs the touch operation determination processing described in FIG. 3. Determination is made regarding the touch operations illustrated in FIG. 12B-1.

In S804, the system controller 50 performs operations corresponding to the commands for feeding images shown in FIG. 12B-1, and determines whether or not an image feed command has been notified. In a case where an image feed command has been notified, the flow advances to S801, and an image in order before or after the image being displayed is displayed on the display unit 28. FIG. 12B-1 shows commands in the playback screen and corresponding operations. The image feed commands include an image feed to switch to an image after in order (forward) and an image feed to switch to an image before in order (back), as shown in FIG. 12B-1. In a case where the playback image is displayed, and a non-selectable function item is displayed (playback Q-settings screen), only functions corresponding to touch-move operations (including flick operations) are available. There are no functions corresponding to the touch-up operations, and no function will be executed by performing a touch-up operation.

In S805, the system controller 50 determines whether or not the Q-settings button 69 has been pressed and a command for displaying a Q-settings screen has been notified. In a case where determination is made that a command for displaying a Q-settings screen has been notified, the flow advances to S806; otherwise, the flow advances to S803.

In S806, the system controller 50 displays the Q-settings function item for the playback image on the display unit 28 (display of playback Q-settings screen). As illustrated in FIG. 9B, pressing the Q-settings button 69 in the playback screen displays, on the right and left edges of the display unit 28, displayed items representing function items of which the settings can be changed, such as displayed items 902, 903, 904, and so forth, which are Q-settings function items, overlaid on the playback image 901. The displayed item 902 is a function item for performing settings to protect the image that is being displayed so that the image will not be deleted (protect image), and displayed item 903 is a function item for applying a favorites mark to the image. A return button 904 is a function item to hide the Q-settings function items (return to playback screen).

In S807, the system controller 50 sets the threshold value for determining touch operations not intended by the user to threshold value 1. Determination is made regarding the touch operations illustrated in FIG. 12B-2.

In S808, the system controller 50 performs the touch operation determination processing described in FIG. 3.

In S809, the system controller 50 performs operations corresponding to the command for function item selection shown in FIG. 12B-2, and determines whether or not a command for function item selection has been notified. In a case where determination is made that a command for function item selection has been notified, the flow advances to S810; otherwise, the flow returns to S808. FIG. 12B-2 shows an operation corresponding to a command for accepting pressing of the Q-settings button 69 during display of a playback screen, at the Q-settings screen.

In S810, the system controller 50 displays the function item settings screen on the display unit 28. The displayed item 902 indicating image protection has been selected in FIG. 9B, and a displayed item to accept an instruction on whether or not to protect the image is displayed in a detailed settings region 905. In this way, detailed settings (selection of whether or not to execute settings changes and functions) regarding function items selected from the function items displayed to the right and left edges are displayed in the detailed settings region 905 to the lower side of the display unit 28. While displaying Q-settings function items (in the Q-settings screen), no image feed is performed even if a touch-move operation is performed; changes to settings of function items by touch-up operations are accepted.

Figure 6A:
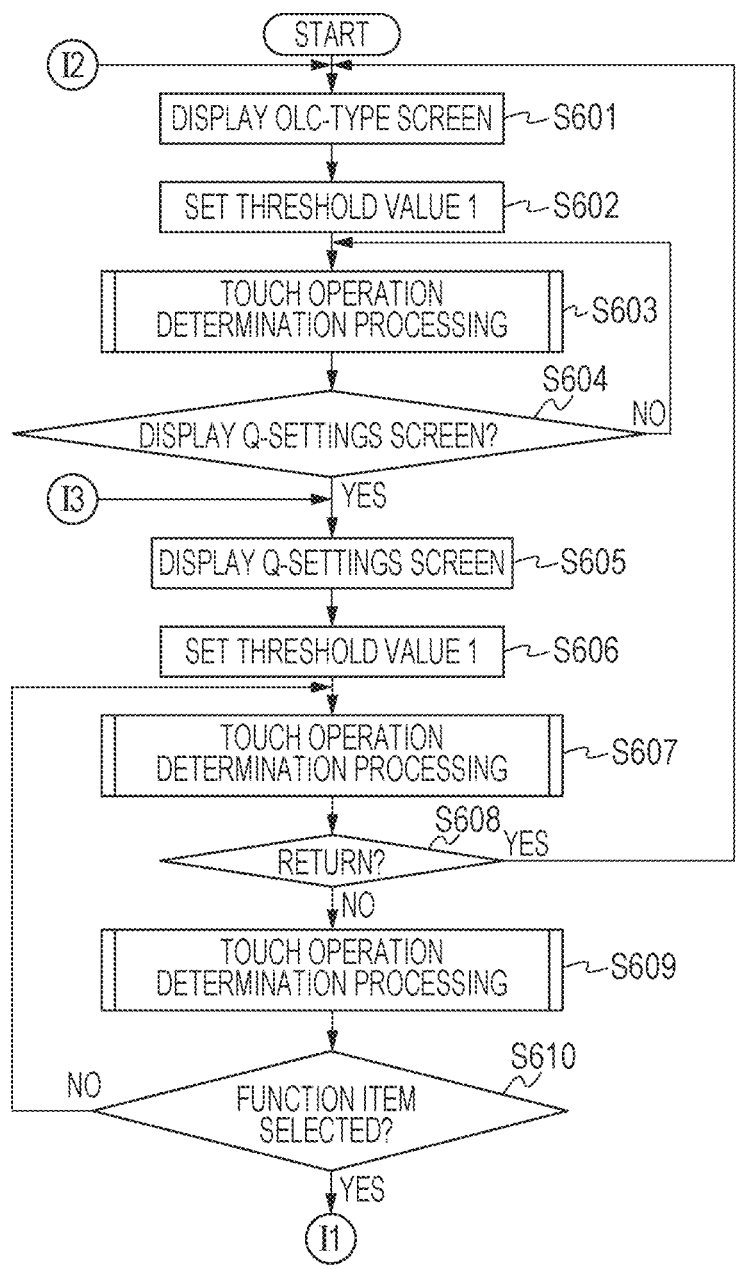
FIGS. 6A and 6B are flowcharts of display processing of an Other-than-viewfinder Liquid Crystal display (OLC)-type screen in the embodiment.
Figure 6B:
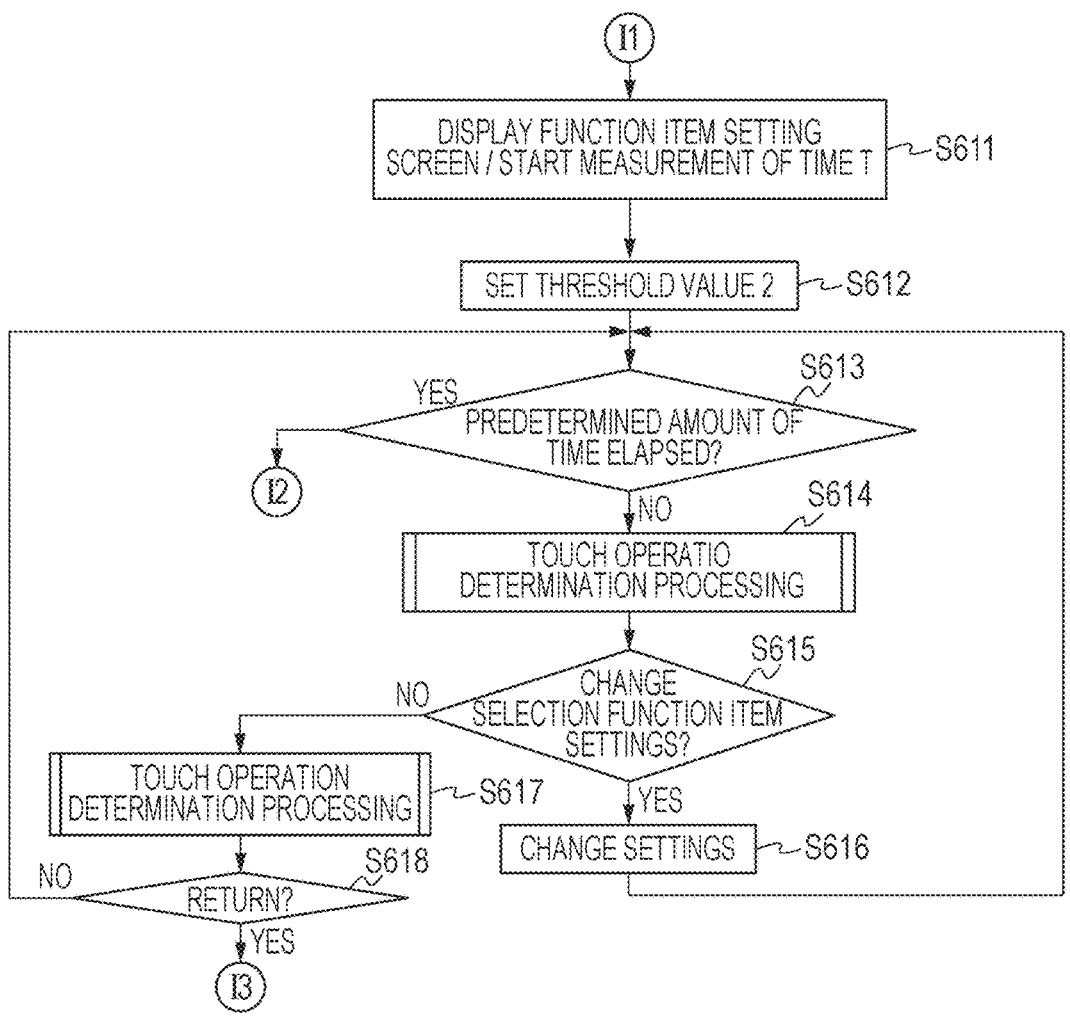

The processing of S812 through S814 is the same as the processing of S614 through S616 in FIG. 6B. This processing is processing for selecting a function item regarding which settings are to be changed, from a list of function items of which settings can be changed, and further performing a settings change operation of the selected function item.

The processing of S815 and S816 is the same as the processing of S617 and S618 in FIG. 6B. This processing is processing for displaying the currently-displayed screen or the original screen, based on whether or not a command has been notified to return to the original screen. Note, however, that in S816, determination is made regarding whether or not a touch-up has been performed from the return button 904 illustrated in FIG. 9B.

Also, besides Q-settings function items, pressing the delete button 68 in the playback screen brings up a function item for selecting whether or not to execute deletion (changes the content of the display), and if a function item to execute deletion is selected, the playback image being displayed is deleted. Pressing the delete button 68 displays a displayed item 906 for executing deletion and a displayed item 907 for quitting deletion (canceling) in FIG. 9C, and the image is deleted or deletion is canceled, in accordance with a touch-up having been performed from these displayed item. In a case where a touch-up is performed from the displayed item 906 in FIG. 9C, the playback image 901 is deleted from the storage medium 200. In a case where a touch-up is performed from the displayed item 907, deletion is not performed, and the screen returns to the playback screen illustrated in FIG. 9A. A screen for executing deletion has a nature that, if a touch-up from the displayed item 906 to execute deletion is performed unintentionally, the image will be deleted regardless of the intent, of the user. Accordingly, the threshold value for image deletion is set to threshold value 1 to make it difficult to execute the function by a touch operation not intended by the user, in the same way as with the Q-settings function items. Although description has been made regarding setting the threshold value for the screen to accept instructions to delete images to a small value, the threshold value may be set small in other screens such as a screen to accept instructions for printing images, and a screen to accept instructions for transferring.

As described above in the flowchart, the threshold value for the touch area for determining touch operations not intended by the user is set high in screens where functions are executed by touch-move operations, such as the playback screen in FIG. 9A. On the other hand, the threshold value is set small in screens where there are no functions executed by touch-moves, and functions are executed by touch-down operations and touch-up operations, as in the playback Q-settings screen in FIG. 9B. The touch area of a touch-move tends to be calculated (touch area detection) larger than that of a touch-down, as described with reference to FIG. 4, so setting the threshold value higher in screens that accept touch-moves makes execution of functions corresponding to operations easier. Also, setting the threshold value lower in screens where functions are executed by touch-downs and touch-ups makes it easier to detect touch operations not intended by the user, thereby making it more difficult to execute functions not intended by the user. Thus, in screens where the touch area is wider in accordance with the operation accepted to execute functions, operationality is given priority, and in screens that accept operations with a small touch area, unintentional touch operations are less readily detected. Also, in screens where there are no functions executed by touch-move, setting the threshold value lower does not reduce operationality. In the playback screen, image feed functions are executed by touch-move, and flicks which are even faster touch-move operations. A flick operation tends to be detected as a wide touch area, so if the threshold value is set to a small value, the flick is readily determined to be a touch operation not intended by the user. Particularly, especially fast flicks tend to be performed in the playback screen, since image feed can be performed by rougher touch-moves than touch-moves to set values on a bar. A greater area is touched in a predetermined amount of time in a fast flick, so a larger touched area is detected even if the user has intentionally performed the touch operation. Thus, in screens where functions are executed by touch-moves, the threshold value for screens where flick operations tend to be performed may be set to a higher value than other screens where touch-moves are performed.

Also, there are no function items in the playback screen relating to shooting, such as where settings are changed by touch operations, so there is no chance of shooting being performed with setting values not intended by the user. Deletion of images cannot be performed by touch operation alone, and the delete button 68 (physical button) has to be pressed, so there is no chance that an image will be deleted by touch operations not intended by the user. Accordingly, the threshold value of the touch area is increased, giving priority to operationality over prevention of erroneous actions.

Figure 10A:
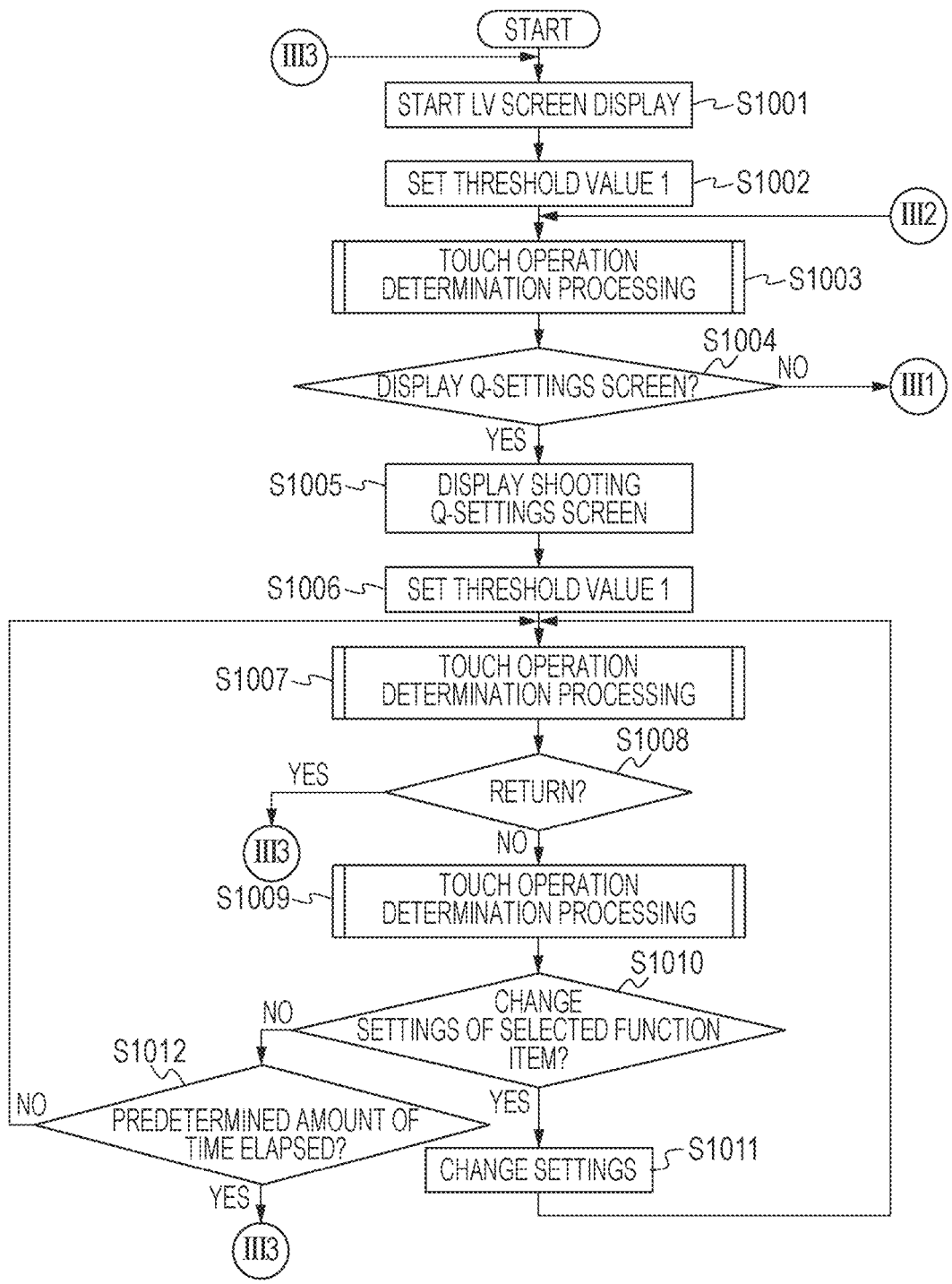
FIGS. 10A and 10B are flowcharts of live view screen display processing in the embodiment.
Figure 10B:
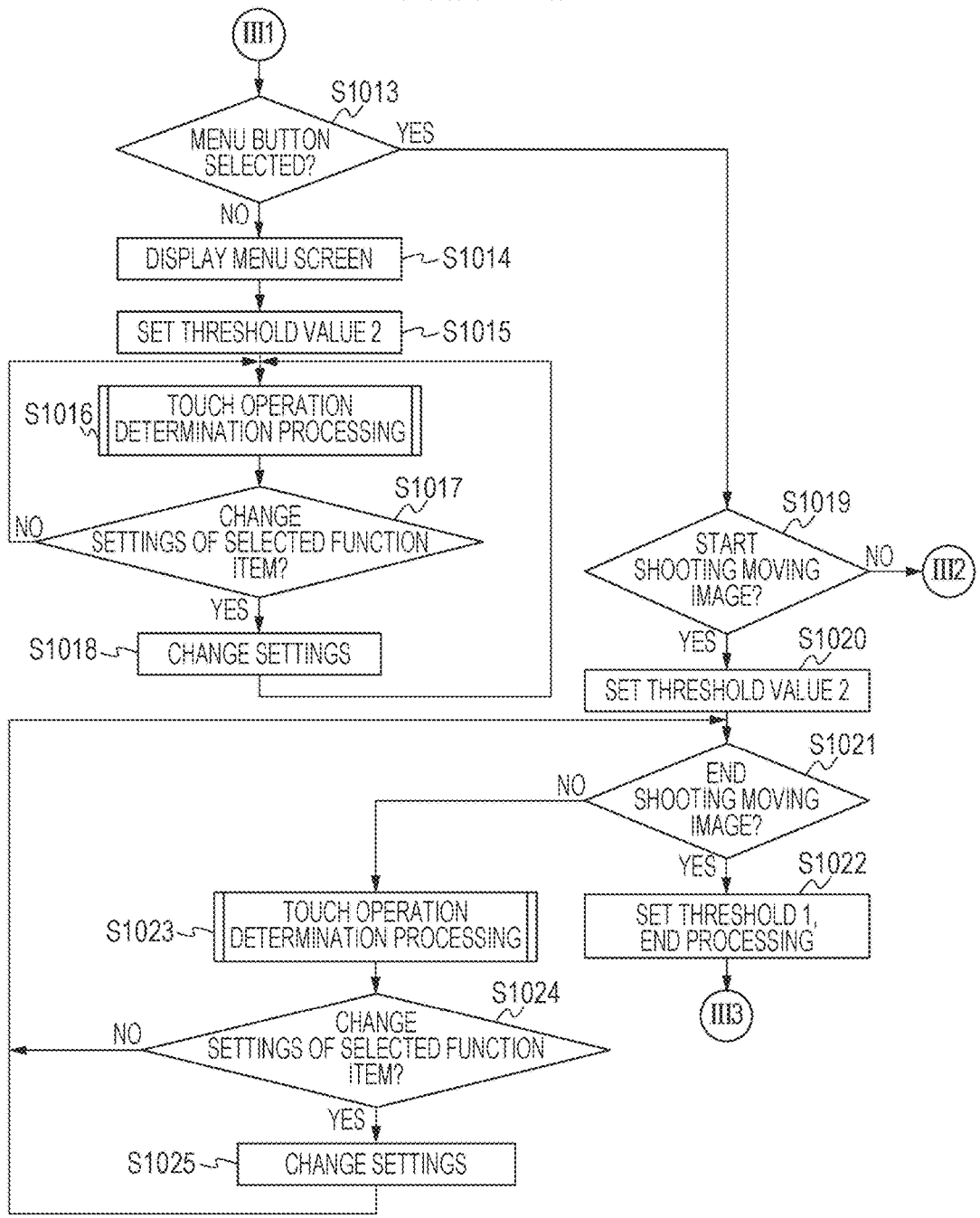

Description of a flowchart for live view image display will be described with reference to FIGS. 10A and 10B. This processing is the processing of S505 in FIG. 5 in detail. This processing is realized by programs stored in the non-volatile memory 56 being loaded to the system memory 52 and being executed by the system controller 50.

Figure 11A:
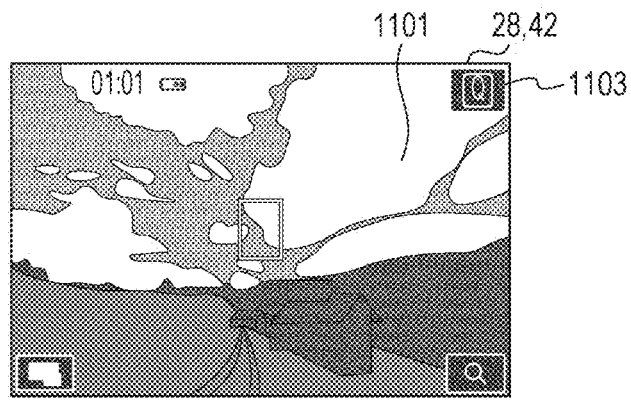
FIGS. 11A through 11D are diagrams illustrating display examples and setting function items in live view screens.

In S1001, the system controller 50 displays a live view image (LV image) on the display unit 28. FIG. 11A illustrates a display example of a live view image 1101 acquired by the imaging unit 22 on the display unit 28.

In S1002, the system controller 50 sets the threshold value for determining whether a touch operation is not intended by the user to threshold value 1. An instruction for still image shooting can be accepted by a touch-down in the live view image 1101 for autofocus at the touch-down position. If the area for the threshold value in this state is large, useless shooting may be performed by unintentional touching by parts of the body of the user other than the finger. Accordingly, the threshold value is set to threshold value 1 so that shooting by touch operations not intended by the user does not readily occur.

In S1003, the system controller 50 performs the touch operation determination processing described in FIG. 3. Determination is made regarding the touch operations illustrated in FIG. 12C-1, In S1004, by touch operation (notified in the processing in S1003) or by the Q-settings button 69 having been pressed, the system controller 50 makes determination regarding whether or not a command has been notified to display the Q-settings screen. In a case where determination has been made that a command has been notified to display the Q-settings screen, the flow advances to S1005; otherwise, the flow advances to S1013. FIGS. 12C-1 shows operations corresponding to commands accepted in a live view screen. Displaying of a shooting Q-settings screen from the live view screen can be performed by a touch-up from a Q-settings touch button 1103 or pressing the Q-settings button 69, as shown in FIG. 12C-1. On the other hand, the menu screen can be displayed by pressing the menu button 78, but not by a touch-up from a displayed item. The processing of S1003, S1004, S1013, and S1019 is repeated until one of the following is notified; a command to display the Q-settings screen, a command to display the menu screen, and a command to start shooting a moving image.

Figure 11B:
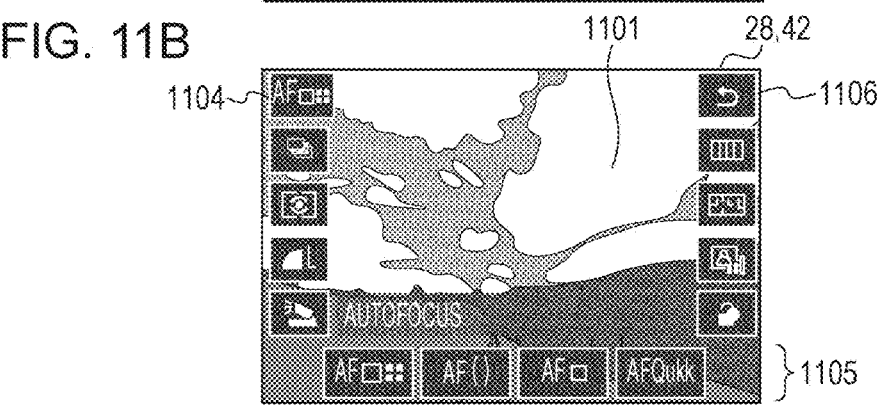
Figure 11C:
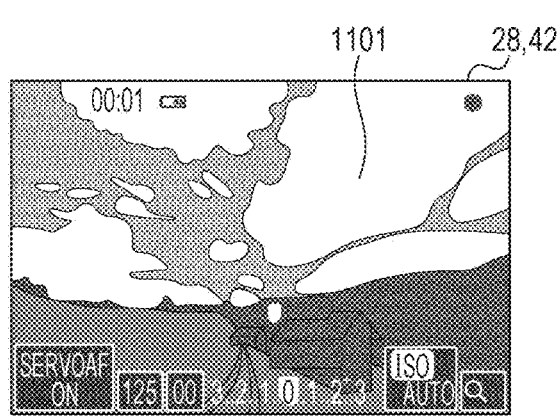

In S1005, the system controller 50 displays the shooting Q-settings screen (shooting settings screen) in the shooting standby screen (live view screen) on the display unit 28 (display of shooting Q-settings function items). FIG. 11B illustrates a display example of a Q-settings screen showing multiple displayed items representing Q-settings function items on the live view screen. A displayed item 1104 is a displayed item for changing AF settings, enabling detailed settings for AF to be performed by performing a touch-up from the displayed item. A detailed settings region 1105 displays setting candidates that can be set for AF, and performing a touch-up from each of the setting candidates displayed items enables function items to be set for the setting candidates. FIG. 12C-2 shows operations corresponding to commands accepted in the Q-settings screen, where a command to display the Q-settings screen has been notified while displaying the live view screen, and the Q-settings screen has been displayed.

In S1006, the system controller 50 sets the threshold value to threshold value 1. The threshold value is still set to threshold value 1 regardless of whether the live view image 1101 or the shooting Q-settings screen is displayed.

The processing of S1007 and S1008 is processing the same as the processing of S607 and S608 in FIG. 6A. Note, however, that this is to hide the shooting Q-settings function items displayed in S1005 upon a command to return to the original screen being notified, thereby returning from the shooting Q-settings screen to the original live view screen (displayed again) in S1007, the system controller 50 performs the touch operation determination processing described in FIG. 3. Determination is made regarding the touch operations illustrated in FIG. 12C-2.

In S1008, the system controller 50 determines whether or not a command has been notified in the processing in S1007 or by the menu button 78 having been pressed, to return to the original screen. Determination is made regarding whether a touch-up has been performed from the return button 702 or the menu button 78 has been pressed, as shown in FIG. 12C-2. In a case where determination is made that a return command has been notified, the flow returns to S1001; otherwise, the flow advances to S1009, In S1009, the system controller 50 performs the touch operation determination processing described in FIG. 3. Determination is made regarding the touch operations illustrated in FIG. 12C-2, In S1010, the system controller 50 determines whether or not a command to change settings has been notified by a touch operation in the detailed settings region (notified by the processing in S1009) or a function item displayed in the detailed settings region has been pressed using the four-way operational key 67 and the set button 65. In a case where determination is made that a command to change settings has been notified, the flow advances to S1011; otherwise, the flow advances to S1012. As described above in relation to S1005, a detailed settings region is displayed in the shooting Q-settings screen to accept changes to setting in accordance with a function item having been selected, so determination is made in S1010 regarding whether or not change to settings of a function item in the detailed settings region has been performed.

In S1011, the system controller 50 changes the settings of a function item regarding which determination was performed in S1010.

The processing in S1012 is the same as that of S613 in FIG. 6B.

In S1013, the system controller 50 performs operations corresponding to the command to display the menu screen shown in FIG. 12C-1, and determination is made regarding whether or not a command to display the menu screen has been notified. In a case where determination is made that a command to display the menu screen has been notified, the flow advances to S1019; otherwise, the flow advances to S1014. The command for menu screen display can be notified by pressing the menu button 76 instead of a touch operation.

Figure 11D:
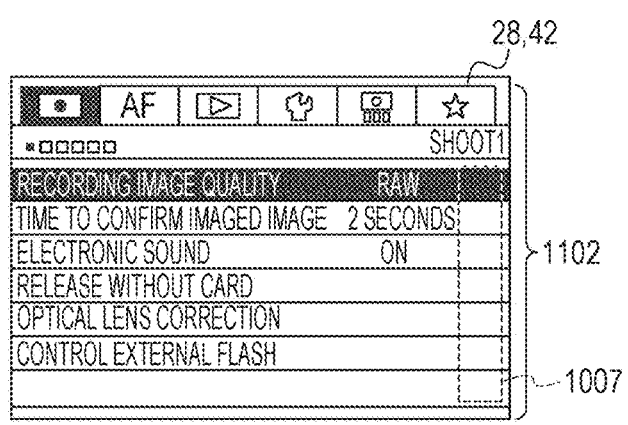

In S1014, the system controller 50 displays the menu screen on the display unit 28. FIG. 11D illustrates a display example of the menu screen 1102. Settings of function items can be changed from the menu screen such as storing image quality, on/off of electronic sound, optical lens correction, and so forth. There are multiple tabs, and choosing other tabs displays other function items on the display unit 28. There are some function items in the menu screen that are included in Q-settings function items such as photometry mode and storing image quality. While the Q-settings function items include function items that tend to often be set in screens such as the playback screen, LV screen, OLC-type screen, and so forth, so as to readily available for changing settings, the menu screen includes a list of function items regarding which settings can be changed in the digital camera 100. Accordingly, function items for which settings are not changed right away while shooting, and function items which have little chance of influencing the image quality of the image being stored, such as on/off of electronic sound, on/off of touch operations, setting clock time, and so forth, are included in the menu screen, In S1015, the system controller 50 sets the threshold value to threshold value 2.

In S1016, the system controller 50 performs the touch operation determination processing described in FIG. 3. Determination is made regarding the touch operations illustrated in FIG. 12D.

In S1017, the system controller 50 determines whether or not a command to change settings has been notified by a touch operation in the menu screen (notified by the processing in S1016) or a function item displayed in the menu screen has been pressed using the four-way operational key 67 and the set button 65. In a case where determination is made that a command to change settings has been notified, the flow advances to S1018; otherwise, the flow advances to S1016.

In S1018, the system controller 50 changes the settings of a function item regarding which determination was performed in S1017. Changing of the settings of function items in the menu screen is accepted in S1016 through S1018. The displayed items representing the function items in the menu screen are narrow in the vertical direction, and the length in the lateral direction is approximately equal to the length of the display unit 28 in the lateral direction as illustrated in the menu screen 1102. Displayed items are displayed aligned with each other. Accordingly, when selecting function items from the menu screen by touch operations, a desired displayed item can be selected by performing a vertical touch-move over the displayed items. In a case of selecting multiple function items while performing a touch-down, there are cases where, when performing a touch-down on a displayed item, the function item is hidden by the finger and which function item is currently selected cannot be told. However, the function items displayed on the menu screen are long in the lateral direction, and there is an edge region 1007 where the function item names are not displayed. Thus, the function item names can be confirmed while performing selection operations by touch operation, by performing touch-downs and touch-moves at the edge region 1007 of the displayed items where the function item names are not displayed. Accordingly, function item selection can be performed from the menu screen by touch-moves. Thus, settings can be changed for a desired menu function item by selecting a desired menu function item and then performing operations to change the setting values.

In S1019, the system controller 50 determines whether or not a command to start shooting of a moving image has been notified by pressing the live view button. 79, shown in FIG. 12C-1. This determination is a determination made in the case of the moving image shooting mode. In a case where determination is made that a command to start shooting of a moving image has been notified, the flow advances to S1020; otherwise, the flow advances to S1003. In a case where the mode is still image mode, pressing the live view button 79 does not start shooting a moving image, and display of the live view ends.

In S1020, the system controller 50 sets the threshold value to threshold value 2. During shooting of moving images, there are cases where a subject with motion is tracked by touch-move operations for focusing (AF), so the threshold value is raised and determination that touch-moves are operations not intended by the user is made less likely to occur (touch operations by touch-moves are made more readily acceptable). Thus, setting to a larger threshold value in accordance with switching to a screen where touch-moves are performed improves the operationality of touch operations. There is little possibility that shooting will be continued with the digital camera hung from the neck during shooting of moving images, rather, there is a greater possibility that the user will be intentionally holding the digital camera or having the digital camera held in a fixed state such as on a tripod or the like. Accordingly, there is little chance of touch operations being performed unintentionally by the user (objects unintentionally coming into contact with the display unit 28) while shooting moving images.

In S1021, the system controller 50 determines whether or not a command to end the shooting of the moving image has been notified by pressing the live view button 79. In a case where determination has been made that a command to end the shooting of the moving image has been notified, the flow advances to S1022; otherwise, the flow advances to S1023.

In S1022, the system controller 50 sets the threshold value to threshold value 1, and performs ending processing of the moving image. The ending processing of the moving image involves compression processing of the shot moving image, creation of a thumbnail, and so forth, and storing along with shooting date and time. No function that operates in accordance with a touch-move operation is assigned to the screen after ending shooting of the moving image, and there is a great possibility that the user will intentionally stop holding the digital camera after ending shooting of the moving image, so the threshold value is set to threshold value 1, as is the case before starting shooting.

The processing of S1023 through S1025 is the same as the processing of S1009 through S1011. Note, however, that S1023 through S1025 is processing to perform operations to update setting of function items during shooting of a moving image, and since the threshold value is set to threshold value 2 due to shooting of the moving image having been started, the threshold value is set to a greater threshold value as compared to the case of S1009 through S1011.

In the flowchart described above, the threshold value for determining touch operations not intended by the user in screens for changing settings of function items is changed according to the type of operation for displaying that screen. A touch-down operation is more readily performed than pressing a button, regardless of user intent. On the other hand, pressing of a button needs to be performed with a stronger force than a touch-down operation, by pressing a certain position of the button, so the possibility that the operation will be performed unintentionally by the user is low. Accordingly, the threshold value is set lower for a screen that can be displayed by a touch-down operation alone (e.g., shooting Q-settings screen) as compared to a screen that can be displayed only by pressing a button (e.g., menu display screen), so execution of functions not intended by the user occurs less readily.

Note that regardless of which of an OLC-type screen, playback screen, live view screen, and menu screen, is displayed on the display unit 28, a still image is shot by pressing the shutter button 61. After shooting a still image, following display of a preview of the shot image (RecReview image), for a predetermined amount of time (after displaying the shot image), the OLC-type screen is displayed. Accordingly, there is a high possibility that a touch operation not intended by the user will be performed in the OLC-type screen initially displayed, if the user walks with the digital camera hanging from the neck after having shot the image. Setting the threshold value to a low value in screens displayed immediately after switching the power source from off to on, and screens that accept function item selection that are displayed automatically after shooting, can prevent erroneous actions by touch operations not intended by the user.

Also, the threshold value in screens where changes to settings of function items are performed is set according to the function items included in the screens. Q-settings screens include function items that can affect the image quality of the image being stored (shooting results). On the other hand, there are function items included in the menu screen that do not readily affect the image quality of the image that has been shot by being changed, regardless of the intent of the user, such as setting of the clock time or on/off of operating sounds. Accordingly, setting the threshold value of the Q-settings screen smaller than the menu screen can improve operationality of the menu screen, and prevent shooting at an unintended image quality in the Q-settings screen due to touch operations not intended by the user. That is to say, the threshold value is set smaller in setting screens including function items which are more likely to affect the image quality of the image being stored (or a screen where there is a list display of function items), as compared to settings screens including function items that do not affect the image quality of the image being stored. On the other hand, the threshold value is set higher in setting screens including function items that do not readily affect the image quality of the image being stored as compared to setting screens of function items that may affect the image quality of the image being stored, thereby improving operationality.

Although description has been made of raising the threshold value during shooting moving images, this is not restrictive, and the threshold value may be raised in a mode where zooming is performed by touch operations, and a shooting mode where settings are changed while shooting by performing touch-move operations. Also, the threshold value may be set small for screens that are likely to be displayed in the state where the user has the digital camera hung from the neck. On the other hand, the threshold value may be set high for screens where the user is likely to be performing operations, such as a character input, screen or the like. Further, function items can be selected in the above-described menus screen where changes to settings can be performed by touch-moves, so the touch-move operationality is raised rather than raising the precision for detecting touch operations not intended by the user.

In the embodiment in the flowcharts illustrated in FIGS. 3, 5, 6A, 6B, 8A, 8B, 10A, and 10B, described above, the threshold value set in accordance with the screen being displayed and the detected touch area are compared, thereby determining whether or not the touch operation was intended by the user. In a case where a touch operation of an area at the set threshold value or above has been performed (the area detected as having been touched was an area at or above the area set as the threshold value), determination is made that the touch operation was not intended by the user, and no function is executed. Also, the threshold value is set so that erroneous operations are not readily accepted, so operationality and the precision of detecting touch operations not intended by user are not deteriorated. That is to say, the chance of functions being executed without the intention of the user can be reduced. Further, the chance of functions being executed by touch operations not intended by the user can be reduced by determining the touch area, regardless of the direction and touch region of the digital camera 100.

There also are cases where touch operations are not, accepted in accordance with detection of proximity of an object, such as a case of detecting an eye being placed at the viewfinder, by a proximity sensor or the like. However, according to the above-described embodiment, touch operations not intended by the user can be detected in cases where the proximity sensor does not respond, in accordance with the touched area.

The threshold values set to the screens are not restricted to the above-described examples, and may be set by the user. The method of detecting the touch area is not restricted to detection by the number of sensor intersections touched as described above, and the size of the touched area may be detected by any appropriate method.

In screens capable of executing functions by touch-downs and touch-ups to displayed items, the threshold value may be set in accordance with the size of the displayed item as described below. That is to say, a threshold value set for a screen displaying displayed items having large area may be set so as to be higher than a threshold value set for a screen that does not include displayed items with a large area but displays displayed items with a small area. Further, in screens where touch-up can be used to execute functions, the threshold value may be set in accordance with the spacing between the displayed items that are displayed, to facilitate touch operations by the user, and to prevent erroneous actions due to unintentionally touching a displayed item near the intended displayed item. That is to say, in a screen where multiple displayed items are displayed, the threshold value set for a screen where the spacing between the displayed items is smaller (the display spacing between displayed items is small) may be smaller as compared to a screen where the spacing is larger. In such a screen where multiple displayed items are displayed, if the spacing between displayed items is so small that another displayed item can be easily touched when the user is touching a desired displayed item, it is better to set the threshold value smaller to prevent, erroneous actions. On the other hand, if the spacing between the displayed items is a predetermined distance or more, such as the breadth of the finger of the user, the threshold value is preferably set higher to improve operationality, since the chance of erroneously touching a displayed item other than the intended displayed item is lower.

Note that control of the electronic apparatus may be performed by one hardware configuration, or may be shared among multiple hardware configurations, to control the overall apparatus.

Although the present invention has been described by way of a preferred embodiment, the present invention is not restricted to such a particular embodiment. It will of course be understood that this invention has been described above by way of example only, and that modifications of detail can be made within the scope of this invention. Further, the above-described embodiment is but an exemplification of the present invention, and various embodiments may be combined as suitable.

Although an example has been described in the above embodiment where the present invention has been applied to a digital camera, this example is not restrictive, and the present invention is applicable to any electronic apparatus that accepts touch operation. That is to say, the present invention is applicable to cellular phone terminals, mobile image viewers, printing apparatuses having touch panels, digital photo frames, music players, gaming consoles, electronic book readers, and so forth.

The present invention can also be realized by executing the following. That is to say, software (programs) realizing the function of the embodiment described above are supplied to a system or apparatus via a network or various types of storing media, a computer (or central processing unit (CPU) or microprocessor unit (MPU)) of the system or apparatus reading out the program code and executing it. In this case, the program, and the storage medium storing the program, make up the present invention.

According to the present invention, the possibility of actions occurring due to touch operations not intended by the user can be reduced.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2015-020640, filed Feb. 4, 2015, which is hereby incorporated by reference herein in its entirety.

What is claimed is:

1. An electronic apparatus comprising:
   a touch detector configured to be capable of detecting touch operations; and
   a controller configured to effect control to,
      in a state where a first screen is displayed,
         execute a function in accordance with a touch operation performed in a case where a touch area of the touch operation is smaller than a first area, and
         not execute a function in accordance with a touch operation performed in a case where the touch area of the touch operation is equal to or larger than the first area, and
      in a state where a second screen is displayed,
         execute a function in accordance with a touch operation performed in a case where the touch area of the touch operation is smaller than a second area that is larger than the first area, and
         not execute a function in accordance with a touch operation performed in a case where the touch area of the touch operation is equal to or larger than the second area.

2. The electronic apparatus according to claim 1, wherein the second screen is displayed in accordance with an operation having been performed relating to a function item displayed in the first screen.

3. The electronic apparatus according to claim 1,
   wherein the first screen is an initial screen displayed in accordance with a power source having been switched from off to on.

4. The electronic apparatus according to claim 1,
   wherein the second screen is a screen where a function executable by an operation with moving of a touch position has been assigned,
   and wherein, when displaying a screen to which a function executable by an operation with moving of a touch position has not been assigned, the controller is configured to effect control to
      execute a function in accordance with a touch operation performed in a case where the touch area of the touch operation is smaller than the first area, and
      not execute a function in accordance with a touch operation performed in a case where the touch area of the touch operation is equal to or larger than the first area.

5. The electronic apparatus according to claim 1,
   wherein the second screen is a screen displaying a playback image on a display unit,
   and wherein, when displaying information relating to shooting an image, the controller is configured to effect control to
      execute a function in accordance with a touch operation performed in a case where the touch area of the touch operation is smaller than the first area, and
      not execute a function in accordance with a touch operation performed in a case where the touch area of the touch operation is not equal to or larger than the first area.

6. The electronic apparatus according to claim 1,
   wherein the first screen is a screen including a displayed item displayable in accordance with a touch operation having been performed, and
   wherein the second screen is a screen displayed that is not displayed in accordance with a touch operation having been performed.

7. The electronic apparatus according to claim 1, further comprising:
   a setting unit configured to set a threshold value used by the controller so that the threshold value used in a case where the first screen is displayed on the display unit is smaller than the threshold value used by the controller in a case where the second screen is displayed on the display unit,
   wherein the controller is configured to invalidate operations by a touch operation in a case where a touch area detected by the touch detector is equal to or larger than the threshold value, and validates operations by the touch operation in a case where the touch area detected by the touch detector is smaller than the threshold value.

8. The electronic apparatus according to claim 7, wherein the second screen is a screen displayed on the display unit while shooting a moving image, and the first screen is a screen displayed on the display unit before shooting or after shooting a moving image.

9. The electronic apparatus according to claim 7, wherein the first screen is a screen to accept deletion of an image displayed on the display unit, and the second screen is a screen that does not accept deletion of an image displayed on the display unit.

10. The electronic apparatus according to claim 7, wherein the setting unit is configured to set the threshold value used by the controller so that the threshold value used in a case where a first settings screen including a function item that affects image quality of an image to be stored is being displayed on the display unit, is smaller than the threshold value used by the controller in a case where a second settings screen including a function item that does not affect image quality of an image to be stored is being displayed on the display unit.

11. The electronic apparatus according to claim 7, wherein the second screen is a screen that accepts a touch-move operation for image feeding, and the first screen is a screen that accepts change to a numerical value to be set to a predetermined function item.

12. The electronic apparatus according to claim 7, wherein the first screen is a screen that displays a displayed item larger than a predetermined area, and the second screen is a screen that does not display a displayed item larger than a predetermined area.

13. The electronic apparatus according to claim 7, wherein the first screen is a screen including displayed items where a distance between a center of a displayed item and a center of another displayed item is smaller than a predetermined distance, and the second screen is a screen that does not include displayed items where a distance between a center of a displayed item and a center of another displayed item is smaller than the predetermined distance.

14. The electronic apparatus according to claim 1, wherein the touch detector is a touch detector of a type that detects touch operations in accordance with amount of change in capacitance generated by a touch operation on sensors included in a touch panel, wherein the controller obtains a position where a touch operation has been performed based on an amount of change equal to or larger than a first threshold value of capacitance at the touch panel, and wherein the touch area is obtained based on a second threshold value that is smaller than the first threshold value of capacitive at the touch panel but equal to or larger than a second threshold value.

15. The electronic apparatus according to claim 1, wherein the touch detector is a capacitive touch detector, and the amount of change in capacitance measured to detect a touch operation is the sum of the amount of change in capacitance occurring over a predetermined amount of time.

16. The electronic apparatus according to claim 1, further comprising:
an imaging unit.

17. The electronic apparatus according to claim 1, further comprising:
a strap portion configured to mount a strap,
wherein, a user holds the electronic apparatus by the strap, a display face of the electronic apparatus faces in a direction of coming into contact with the user.

18. The electronic apparatus according to claim 1 wherein the first screen is a screen to which a function executable by an operation including moving a touch position has been assigned, and
wherein the second screen is a screen to which a function executable by an operation including moving a touch position has not been assigned.

19. A control method of an electronic apparatus, the method comprising:
a touch detecting step capable of detecting touch operations; and
a control step where
in a state where a first screen is displayed,
a function is executed in accordance with a touch operation performed in a case where a touch area of the touch operation is smaller than a first area, and
a function is not executed in accordance with a touch operation performed in a case where the touch area of the touch operation is equal to or larger than the first area, and
in a state where a second screen is displayed,
a function is executed in accordance with a touch operation performed in a case where the touch area of the touch operation is smaller than a second area that is larger than the first area, and
a function is not executed in accordance with a touch operation performed in a case where the touch area of the touch operation is equal to or larger than the second area.

20. A non-transitory computer-readable storage medium storing a program for causing a computer to function as components of an electronic apparatus comprising:
a touch detector configured to be capable of detecting touch operations; and
a controller configured to effect control to,
in a state where a first screen is displayed,
execute a function in accordance with a touch operation performed in a case where a touch area of the touch operation is smaller than a first area, and
not execute a function in accordance with a touch operation performed in a case where the touch area of the touch operation is equal to or larger than the first area, and
in a state where a second screen is displayed,
execute a function in accordance with a touch operation performed in a case where the touch area of the touch operation is smaller than a second area that is larger than the first area, and
not execute a function in accordance with a touch operation performed in a case where the touch area of the touch operation is equal to or larger than the second area.

* * * * *